(12) United States Patent
Kawakami

(10) Patent No.: US 8,927,148 B2
(45) Date of Patent: Jan. 6, 2015

(54) POWER STORAGE DEVICE

(75) Inventor: Takahiro Kawakami, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 685 days.

(21) Appl. No.: 13/113,602

(22) Filed: May 23, 2011

(65) Prior Publication Data

US 2011/0300441 A1 Dec. 8, 2011

(30) Foreign Application Priority Data

Jun. 2, 2010 (JP) ................................. 2010-127236
Jun. 11, 2010 (JP) ................................. 2010-134107

(51) Int. Cl.
*H01M 4/64* (2006.01)
*H01M 4/58* (2010.01)
*H01M 4/136* (2010.01)
*H01M 4/36* (2006.01)
*H01M 10/052* (2010.01)
*H01M 4/04* (2006.01)
*H01M 4/02* (2006.01)

(52) U.S. Cl.
CPC ............ *H01M 4/5825* (2013.01); *H01M 4/136* (2013.01); *H01M 4/366* (2013.01); *H01M 10/052* (2013.01); *H01M 4/0404* (2013.01); *H01M 2004/028* (2013.01); *Y02E 60/122* (2013.01)
USPC .......................................... 429/211; 429/213

(58) Field of Classification Search
CPC ....... H01M 4/36; H01M 4/64; H01M 4/5805; H01M 4/52; H01M 4/50; H01M 4/525
USPC ................................................... 429/213, 211
See application file for complete search history.

(56) References Cited

U.S. PATENT DOCUMENTS

| 7,638,236 B2 | 12/2009 | Ugaji et al. |
| 7,718,314 B2 | 5/2010 | Komiyama et al. |
| 2004/0096743 A1* | 5/2004 | Okae et al. ................. 429/231.1 |

(Continued)

FOREIGN PATENT DOCUMENTS

| CN | 001495945 A | 5/2004 |
| CN | 101099250 A | 1/2008 |

(Continued)

OTHER PUBLICATIONS

International Search Report (Application No. PCT/JP2011/061005; PCT13598/13621) Dated Aug. 23, 2011.

(Continued)

*Primary Examiner* — Karie O'Neill Apicella
(74) *Attorney, Agent, or Firm* — Nixon Peabody LLP; Jeffrey L. Costellia

(57) ABSTRACT

A power storage device including a positive electrode in which a positive electrode active material is formed over a positive electrode current collector and a negative electrode which faces the positive electrode with an electrolyte interposed therebetween is provided. The positive electrode active material includes a first region which includes a compound containing lithium and one or more of manganese, cobalt, and nickel; and a second region which covers the first region and includes a compound containing lithium and iron. Since a superficial portion of the positive electrode active material includes the second region containing iron, an energy barrier when lithium is inserted into and extracted from the surface of the positive electrode active material can be decreased.

14 Claims, 14 Drawing Sheets

(56) References Cited

U.S. PATENT DOCUMENTS

| | | | |
|---|---|---|---|
| 2007/0292759 A1* | 12/2007 | Ugaji et al. | 429/223 |
| 2008/0248382 A1 | 10/2008 | Sastry et al. | |
| 2008/0268339 A1 | 10/2008 | Suzuki | |
| 2010/0163790 A1 | 7/2010 | Ceder et al. | |
| 2011/0269023 A1 | 11/2011 | Kawakami et al. | |
| 2011/0294009 A1 | 12/2011 | Kawakami et al. | |

FOREIGN PATENT DOCUMENTS

| | | | | |
|---|---|---|---|---|
| CN | 101669235 A | | 3/2010 | |
| CN | 101682029 A | | 3/2010 | |
| JP | 11-025983 | | 1/1999 | |
| JP | 2002-075368 | | 3/2002 | |
| JP | 2007-103339 | | 4/2007 | |
| JP | 2010095432 A | * | 4/2010 | C01B 25/45 |
| JP | 2010-517240 | | 5/2010 | |
| JP | 2010-524158 | | 7/2010 | |
| JP | 2011-210693 A | | 10/2011 | |
| JP | 2012-094407 A | | 5/2012 | |
| WO | WO 2006-027925 A2 | | 3/2006 | |
| WO | WO 2008/091707 A2 | | 7/2008 | |
| WO | WO 2008/121972 A2 | | 10/2008 | |

OTHER PUBLICATIONS

Written Opinion (Application No. PCT/JP2011/061005; PCT13598/13621) Dated Aug. 23, 2011.

Zhou, et al., "The Li Intercalation Potential of $LiMPO_4$ and $LiMSiO_4$ Olivines with M = Fe, Mn, Co, Ni", Electrochemistry Communications, Nov. 1, 2004, vol. 6, No. 11, pp. 1144-1148.

Kang, et al., "Battery Materials for Ultrafast Charging and Discharging", Nature, Mar. 12, 2009, vol. 458, No. 12, pp. 190-193.

Chinese Office Action (Application No. 201180026610.3) Dated Sep. 22, 2014.

* cited by examiner

POWER STORAGE DEVICE

TECHNICAL FIELD

One embodiment of the disclosed invention relates to a power storage device.

BACKGROUND ART

The field of portable electronic devices such as personal computers and cellular phones has progressed significantly. The portable electronic device needs a chargeable power storage device having high energy density, which is small, lightweight, and reliable. As such a power storage device, for example, a lithium-ion secondary battery is known. In addition, development of electrically propelled vehicles on which secondary batteries are mounted has also been progressing rapidly from a rise of growing awareness to environmental problems and energy problems.

In a lithium-ion secondary battery, as a positive electrode active material, a phosphate compound having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), or lithium nickel phosphate ($LiNiPO_4$), has been known (see Patent Document 1, Non-Patent Document 1, and Non-Patent Document 2).

Lithium iron phosphate is expressed by a composition formula, $LiFePo_4$, and $FePO_4$ which is formed by completely extracting lithium from $LiFePo_4$ is also stable; thus, high capacity can be safely achieved with lithium iron phosphate.

REFERENCE

Patent Document

[Patent Document 1] Japanese Published Patent Application No. H11-25983

Non-Patent Document

[Non-Patent Document 1] Byoungwoo Kang, Gerbrand Ceder, "Nature", (United Kingdom of Great Britain and Northern Ireland), 2009, March, Vol. 458, pp. 190-193

[Non-Patent Document 2] F. Zhou et al., "Electrochemistry Communications", (Kingdom of the Netherlands), 2004, November, Vol. 6, No. 11, pp. 1144-1148

DISCLOSURE OF INVENTION

A positive electrode active material which includes a phosphate compound having an olivine structure and containing lithium and manganese described above has realized a high discharge potential as compared to a positive electrode active material which includes a phosphate compound having an olivine structure and containing lithium and iron. The theoretical capacity of a phosphate compound having an olivine structure and containing lithium and manganese (e.g., general formula: $LiMnPO_4$) and that of a phosphate compound having an olivine structure and containing lithium and iron (e.g., general formula: $LiFePO_4$) are almost the same. Accordingly, a positive electrode active material which includes a phosphate compound having an olivine structure and containing lithium and manganese is expected to have high energy density.

However, even when a positive electrode active material which includes a phosphate compound having an olivine structure and containing lithium and manganese is used, the expected capacity has not been obtained. One reason of this is thought to be existence of an energy barrier when lithium is inserted into and extracted from a surface of the active material.

In view of the above problems, an object of one embodiment of the disclosed invention is to provide a power storage device having large capacity, high discharge voltage, and high energy density.

One embodiment of the present invention is a power storage device including a positive electrode in which a positive electrode active material is formed over a positive electrode current collector; and a negative electrode which faces the positive electrode with an electrolyte interposed therebetween. The positive electrode active material includes a first region including a compound containing lithium (Li) and one or more of manganese (Mn), cobalt (Co), and nickel (Ni); and a second region covering the first region and including a compound containing lithium (Li) and iron (Fe).

One embodiment of the present invention is a positive electrode active material of a power storage device, which includes a first region including a compound containing lithium and one or more of manganese, cobalt, and nickel; and a second region covering the first region and including a compound containing lithium and iron.

The positive electrode active material is in particle form, and a positive electrode active material layer described later may include a plurality of particles.

The first region and the second region are in film form, and a positive electrode active material layer described later may include a positive electrode active material in film form.

In the positive electrode active material in particle form or the positive electrode active material in film form, the first region may include a phosphate compound containing lithium and one or more of manganese, cobalt, and nickel. Further, the second region may include a phosphate compound containing lithium and iron. As a typical example of a phosphate compound, a phosphate compound having an olivine structure is given. The phosphate compound containing lithium and one or more of manganese, cobalt, and nickel, which forms the first region, may include a region having an olivine structure. The phosphate compound containing lithium and iron, which forms the second region, may include a region having an olivine structure. Further, a phosphate compound having an olivine structure may be included in both the first region and the second region. The structure of the first region may be a single crystal structure, a polycrystalline structure, a microcrystalline structure, or an amorphous structure. The structure of the second region may be a single crystal structure, a polycrystalline structure, a microcrystalline structure, or an amorphous structure.

In the positive electrode active material in particle form or the positive electrode active material in film form, the second region is in film form, and the second region should cover at least part of the first region. It is preferable that the second region cover 30% or higher of a surface of the first region, more preferably 100% of the surface of the first region.

The phosphate compound containing lithium and one or more of manganese, cobalt, and nickel may include a substance expressed by a general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1). The phosphate compound containing lithium and iron may include a substance expressed by a general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1). M is one or more elements of Mn, Co, and Ni and in addition, Me is one or more elements of Mn, Co, and Ni. In the case where M and Me are two or more elements of Mn, Co, and Ni, there is no particular limitation on the ratio of the constituent elements.

The cases where, in the substance expressed by the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1), M is one or more elements are described below.

In the case where M is one element of Mn, Co, and Ni, the substance included in the first region is expressed by a general formula, $Li_{1-x1}Fe_a(M1)_bPO_4$ (x1 is greater than or equal to 0 and less than or equal to 1; M1 is one of Mn, Co, and Ni; and a+b=1, a is greater than or equal to 0 and less than 1, and b is greater than 0 and less than or equal to 1).

In the case where M is two elements of Mn, Co, and Ni, the substance included in the first region is expressed by a general formula, $Li_{1-x1}Fe_a(M1)_b(M2)_cPO_4$ (x1 is greater than or equal to 0 and less than or equal to 1; M1≠M2, M1 and M2 are each one of Mn, Co, and Ni; and a+b+c=1, a is greater than or equal to 0 and less than 1, b is greater than 0 and less than 1, and c is greater than 0 and less than 1).

In the case where M is three elements of Mn, Co, and Ni, the substance included in the first region is expressed by a general formula, $Li_{1-x1}Fe_a(M1)_b(M2)_c(M3)_dPO_4$ (x1 is greater than or equal to 0 and less than or equal to 1; M1≠M2, M1≠M3, M2≠M3, and M1, M2, and M3 are each one of Mn, Co, and Ni; and a+b+c+d=1, a is greater than or equal to 0 and less than 1, b is greater than 0 and less than 1, c is greater than 0 and less than 1, and d is greater than 0 and less than 1).

The cases where, in the substance expressed by the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1), Me is one or more elements are described below.

In the case where Me is one element of Mn, Co, and Ni, the substance included in the second region is expressed by a general formula, $Li_{1-x2}Fe_a(Me1)_bPO_4$ (x2 is greater than or equal to 0 and less than or equal to 1; Me1 is one of Mn, Co, and Ni; and a+b=1, a is greater than 0 and less than or equal to 1, and b is greater than or equal to 0 and less than 1).

In the case where Me is two elements of Mn, Co, and Ni, the substance included in the second region is expressed by a general formula, $Li_{1-x2}Fe_a(Me1)_b(Me2)_cPO_4$ (x2 is greater than or equal to 0 and less than or equal to 1; Me1≠Me2, and Me1 and Me2 are each one of Mn, Co, and Ni; and a+b+c=1, a is greater than 0 and less than 1, b is greater than 0 and less than 1, and c is greater than 0 and less than 1).

In the case where Me is three elements of Mn, Co, and Ni, the substance included in the second region is expressed by a general formula, $Li_{1-x2}Fe_a(Me1)_b(Me2)_c(Me3)_dPO_4$ (x2 is greater than or equal to 0 and less than or equal to 1; Me1≠Me2, Me1≠Me3, Me2≠Me3, and Me1, Me2 and Me3 are each one of Mn, Co, and Ni; and a+b+c+d=1, a is greater than 0 and less than 1, b is greater than 0 and less than 1, c is greater than 0 and less than 1, and d is greater than 0 and less than 1).

The substance expressed by the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1), may have an olivine structure.

The substance expressed by the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1), may have an olivine structure.

Since the axis directions of the crystal lattices of the first region and the second region are the same, the path (channel) of diffusion of lithium is not bent and lithium diffuses one-dimensionally; thus, charge and discharge are easily performed. Note that in this specification, the expression "the same" is used to mean also the case where a difference between the axis direction of the crystal lattice of the first region and that of the second region is within 10 degrees and they are substantially the same.

The first region and the second region preferably have a concentration gradient of a transition metal, in order to change continuously the lattice constant of the first region and the second region. When the lattice constant is continuously changed, stress or distortion is reduced; thus, diffusion of lithium is easily performed.

In the case of the positive electrode active material in particle form, the grain size of the particle is preferably greater than or equal to 10 nm and less than or equal to 200 nm, more preferably greater than or equal to 20 nm and less than or equal to 80 nm. The particle of the positive electrode active material is small when the grain size of the particle of the positive electrode active material is within the above range; therefore, lithium ions are easily inserted and extracted. Thus, rate characteristics of a secondary battery are improved and charge and discharge can be performed in a short time.

Further, in the case where the second region of the positive electrode active material in particle form is in film form, a thin covering film can be formed even when the particle of the positive electrode active material is small. With the use of a thin covering film, the proportion of the second region can be made small, so that a decrease in energy density can be suppressed.

When the thickness of the second region is preferably 1 nm to 8 nm in the positive electrode active material in particle form or the positive electrode active material in film form, the proportion of the second region in the positive electrode active material is small and a decrease in energy density per unit weight can be suppressed.

One embodiment of the present invention is a positive electrode active material in particle form which includes a compound containing lithium (Li), iron (Fe), and one or more of manganese (Mn), cobalt (Co), and nickel (Ni) and in which a superficial portion of the positive electrode active material has higher iron concentration than a center portion of the positive electrode active material.

One embodiment of the present invention is a positive electrode active material in particle form which includes a compound containing lithium, iron, and one or more of manganese, cobalt, and nickel, in which a second region of the positive electrode active material has higher iron concentration than a first region of the positive electrode active material, and in which the first region is closer to the center than the second region.

The positive electrode active material is in particle form, and a positive electrode active material layer described later may include a plurality of particles.

One embodiment of the present invention is a power storage device including a positive electrode in which a positive electrode active material is formed over a positive electrode current collector; and a negative electrode which faces the positive electrode with an electrolyte interposed therebetween. The positive electrode active material is in film form and includes a compound containing lithium (Li), iron (Fe), and one or more of manganese (Mn), cobalt (Co), and nickel (Ni). A superficial portion of the positive electrode active material has higher iron concentration than a portion close to the positive electrode current collector of the positive electrode active material.

One embodiment of the present invention is a power storage device including a positive electrode in which a positive electrode active material is formed over a positive electrode current collector; and a negative electrode which faces the positive electrode with an electrolyte interposed therebetween. The positive electrode active material is in film form and includes a compound containing lithium, iron, and one or more of manganese, cobalt, and nickel. A second portion of the positive electrode active material has higher iron concentration than a first portion of the positive electrode active material, and the second portion is closer to a surface than the first portion.

A positive electrode active material layer described later may include a positive electrode active material in film form.

In the positive electrode active material in particle form or the positive electrode active material in film form, the compound containing lithium, iron, and one or more of manganese, cobalt, and nickel may be a phosphate compound. As a typical example of a phosphate compound, a phosphate compound having an olivine structure can be given. The phosphate compound containing lithium, iron, and one or more of manganese, cobalt, and nickel may include a region having an olivine structure. The structure of the phosphate compound containing lithium, iron, and one or more of manganese, cobalt, and nickel may be a single crystal structure, a polycrystalline structure, a microcrystalline structure, or an amorphous structure.

The phosphate compound containing lithium, iron, and one or more of manganese, cobalt, and nickel may include a substance expressed by a general formula, $Li_{1-x}Fe_yM_{1-y}PO_4$ (x is greater than or equal to 0 and less than or equal to 1; M is one or more of Mn, Co, and Ni; and y is greater than 0 and less than 1). M is one or more elements of Mn, Co, and Ni. In the case where M is two or more elements of Mn, Co, and Ni, there is no particular limitation on the ratio of the constituent elements.

The cases where, in the substance expressed by the general formula, $Li_{1-x}Fe_yM_{1-y}PO_4$ (x is greater than or equal to 0 and less than or equal to 1; M is one or more of Mn, Co, and Ni; and y is greater than 0 and less than 1), M is one or more elements are described below.

In the case where M is one element of Mn, Co, and Ni, the substance included in the positive electrode active material is expressed by a general formula, $Li_{1-x}Fe_a(M1)_bPO_4$ (x is greater than or equal to 0 and less than or equal to 1; M1 is one of Mn, Co, and Ni; and a+b=1, a is greater than 0 and less than 1, and b is greater than 0 and less than 1).

In the case where M is two elements of Mn, Co, and Ni, the substance included in the positive electrode active material is expressed by a general formula, $Li_{1-x}Fe_a(M1)_b(M2)_cPO_4$ (x is greater than or equal to 0 and less than or equal to 1; M1≠M2, and M1 and M2 are each one of Mn, Co, and Ni; and a+b+c=1, a is greater than 0 and less than 1, b is greater than 0 and less than 1, and c is greater than 0 and less than 1).

In the case where M is three elements of Mn, Co, and Ni, the substance included in the positive electrode active material is expressed by a general formula, $Li_{1-x}Fe_a(M1)_b(M2)_c(M3)_dPO_4$ (x is greater than or equal to 0 and less than or equal to 1; M1≠M2, M1≠M3, M2≠M3, and M1, M2 and M3 are each one of Mn, Co, and Ni; and a+b+c+d=1, a is greater than 0 and less than 1, b is greater than 0 and less than 1, c is greater than 0 and less than 1, and d is greater than 0 and less than 1).

The substance expressed by the general formula, $Li_{1-x}Fe_yM_{1-y}PO_4$ (x is greater than or equal to 0 and less than or equal to 1; M is one or more of Mn, Co, and Ni; and y is greater than 0 and less than 1), may have an olivine structure.

According to one embodiment of the disclosed invention, a power storage device having large capacity, high discharge voltage, and high energy density can be obtained.

BEST MODE FOR CARRYING OUT THE INVENTION

Figure 1:
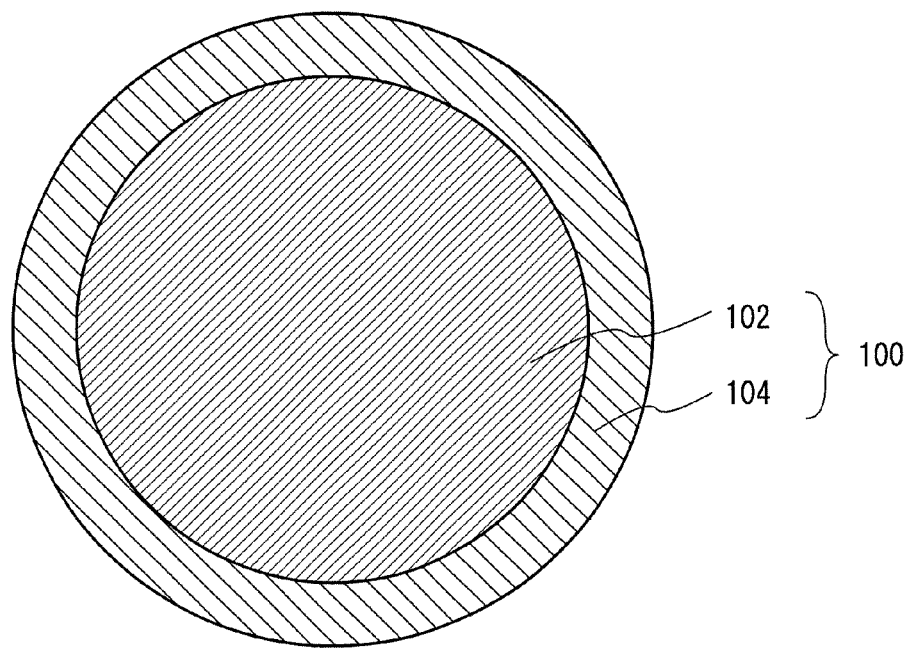
FIG. 1 is an example of a cross-sectional view of a positive electrode active material (in particle form).

Hereinafter, embodiments of the present invention will be described with reference to the drawings. Note that the present invention is not limited to the following description. The present invention can be implemented in various different ways and it will be readily appreciated by those skilled in the art that various changes and modifications are possible without departing from the spirit and the scope of the present invention. Therefore, the present invention should not be construed as being limited to the following description of the embodiments. Note that reference numerals denoting the same portions are commonly used in different drawings.

Note that the size, the thickness of a layer, and a region of each structure illustrated in the drawings and the like in the embodiments are exaggerated for simplicity in some cases. Therefore, the scale of each structure is not necessarily limited to that illustrated in the drawings.

Note that ordinal numbers such as "first", "second", and "third" in this specification are used in order to identify components, and the terms do not limit the components numerically.

Embodiment 1

In this embodiment, a structure of a positive electrode active material in particle form which is one embodiment of the present invention will be described with reference to FIG. 1.

FIG. 1 is a schematic cross-sectional view of a positive electrode active material in particle form which is one embodiment of the present invention.

As illustrated in FIG. 1, in this embodiment, a positive electrode active material 100 includes a first region which includes a compound containing lithium and one or more of manganese, cobalt, and nickel (hereinafter, this region is referred to as a first region 102); and a second region which covers a surface of the first region 102 and includes a compound containing lithium and iron (hereinafter, this region is referred to as a second region 104).

The positive electrode active material is in particle form, and a positive electrode active material layer described later may be formed using a plurality of particles of the positive electrode active material.

That is, the positive electrode active material 100 is formed using a particle of a positive electrode active material including the first region 102 which is located on the center side and includes a compound containing lithium and one or more of manganese, cobalt, and nickel; and the second region 104 which covers the surface of the first region 102 and includes a compound containing lithium and iron. The second region 104 is in film form, and the second region 104 should cover at least part of the first region 102. It is preferable that the second region 104 cover 30% or higher of the surface of the first region 102, more preferably 100% of the surface of the first region 102. Since a superficial portion of the particle of the positive electrode active material includes the second region 104 containing iron in film form, an energy barrier when lithium is inserted into and extracted from the surface of the positive electrode active material can be decreased. As a result, the positive electrode active material 100 makes it possible to bring an available capacity close to a theoretical capacity and utilize a high discharge potential of one or more of manganese, cobalt, and nickel.

The first region 102 may be formed using a phosphate compound containing lithium and one or more of manganese, cobalt, and nickel. As a typical example of a phosphate compound, a phosphate compound having an olivine structure can be given. The phosphate compound containing lithium and one or more of manganese, cobalt, and nickel, which forms the first region 102, may include a region having an olivine structure.

In the case where the first region 102 is formed using a phosphate compound including a region having an olivine structure, the first region 102 includes lithium, a transition metal, and phosphoric acid ($PO_4$). As the transition metal of the first region 102, the one containing one or more of iron, manganese, cobalt, and nickel and one or more of manganese, cobalt, and nickel can be given. When the first region 102 contains one or more of manganese, cobalt, and nickel having a high oxidation-reduction potential, a high discharge potential is realized. Further, the higher the proportion of one or more of manganese, cobalt, and nickel in the positive electrode active material is, the higher the proportion of discharge capacity due to oxidation-reduction of one or more of manganese, cobalt, and nickel becomes, so that high energy density can be realized.

The phosphate compound containing lithium and one or more of manganese, cobalt, and nickel, which forms the first region 102, may include a substance expressed by a general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1). The substance expressed by the above general formula may have an olivine structure. When y1 is made to be greater than or equal to 0 and less than 1, preferably less than or equal to 0.1, more preferably 0, higher energy density can be realized.

The second region 104 may be formed using a phosphate compound containing lithium and iron. As a typical example of a phosphate compound, a phosphate compound having an olivine structure can be given. The phosphate compound containing lithium and iron, which forms the second region 104, may include a region having an olivine structure.

In the case where the second region 104 is formed using a phosphate compound including a region having an olivine structure, the second region 104 includes lithium, a transition metal, and phosphoric acid ($PO_4$). As the transition metal of the second region 104, the one containing iron and one or more of iron, manganese, cobalt, and nickel can be given.

The phosphate compound containing lithium and iron, which forms the second region 104, may include a substance expressed by a general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1). The substance expressed by the above general formula may have an olivine structure.

The second region 104 is preferably formed using a compound functioning as a positive electrode active material which contributes to charge and discharge, in order not to lead to a reduction in capacity. In the case where a phosphate compound having an olivine structure is used for the second region 104, high capacity can be realized in charging and discharging.

On the other hand, the second region 104 contains iron; thus, a discharge potential is decreased and energy density is decreased. Therefore, the smaller the ratio c of the thickness d of the second region 104 to the grain size r of the particle of the positive electrode active material 100 (c=d/r) is, the better. The ratio c is preferably greater than or equal to 0.005 and less than or equal to 0.25, more preferably greater than or equal to 0.01 and less than or equal to 0.1. Specifically, the thickness of the second region is preferably about 1 nm to 8 nm. In addition, when the ratio c is changed, a positive electrode active material having desirable energy density can be formed. In the general formula, $Li_{1-x2}Fe_{y2}Me_{1-y2}PO_4$ (x2 is greater than or equal to 0 and less than or equal to 1; and Me is one or more of Mn, Co, and Ni), y2 is made to be greater than 0 and less than or equal to 1, preferably greater than or equal to 0.15 and less than or equal to 0.5, more preferably greater than or equal to 0.2 and less than or equal to 0.3, whereby higher energy density can be realized.

Lithium is extracted from and inserted into the compounds in the first region 102 and the second region 104 during charge and discharge. Therefore, in the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1), and in the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1), x1 and x2 are each a given value in the range of 0 to 1. In some cases, the first region 102 and the second region 104 each have a lithium concentration gradient.

In the first region 102, the concentration of the transition metal contained in the compound is not necessarily constant. Also in the second region 104, the concentration of the transition metal contained in the compound is not necessarily constant.

For the compounds in the first region 102 and the second region 104, an alkali metal (e.g., sodium (Na) or potassium (K)), an alkaline earth metal (e.g., calcium (Ca), strontium (Sr), or barium (Ba)), beryllium (Be), or magnesium (Mg) can be used instead of lithium. Alternatively, for the compounds in the first region 102 and the second region 104, a compound containing lithium and one or more of an alkali metal and an alkaline earth metal can be used.

In the case of the second region 104 in film form, a thin covering film can be formed even when the particle of the positive electrode active material 100 is small. With the use of a thin covering film, the proportion of the second region 104 can be made small, so that a decrease in energy density can be suppressed. When the second region 104 is in film form, a ratio of an interface with the first region 102 to the volume of the second region 104 is high; thus, coverage with the second region 104 can be improved without increasing the volume of the second region 104.

The positive electrode active material 100 described in this embodiment is formed using a particle of a positive electrode active material including the first region 102 which is located on the center side and includes a compound containing lithium and one or more of manganese, cobalt, and nickel; and the second region 104 which covers the surface of the first region 102 and includes a compound containing lithium and iron. The second region 104 is in film form, and the second region 104 should cover at least part of the first region 102. It is preferable that the second region 104 cover 30% or higher of the surface of the first region 102, more preferably 100% of the surface of the first region 102. Since the superficial portion of the particle of the positive electrode active material includes the second region 104 containing iron in film form, an energy barrier when lithium is inserted into and extracted from the surface of the positive electrode active material can be decreased. As a result, the positive electrode active material 100 makes it possible to bring an available capacity close to a theoretical capacity and utilize a high discharge potential of one or more of manganese, cobalt, and nickel.

Embodiment 2

In this embodiment, a positive electrode active material having higher discharge capacity and higher energy density than the positive electrode active material in Embodiment 1 will be described.

In this embodiment, the case where both the first region 102 and the second region 104 include a positive electrode active material containing a phosphate compound having an olivine structure is described.

A substance included in the first region 102 has an olivine structure, and includes lithium, a transition metal, and phosphoric acid ($PO_4$). The transition metal of the first region 102 contains one or more of iron, manganese, cobalt, and nickel and one or more of manganese, cobalt, and nickel. The substance included in the first region 102 is expressed by the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1).

A substance included in the second region 104 has an olivine structure, and includes lithium, a transition metal, and phosphoric acid ($PO_4$). The transition metal of the second region 104 contains iron and one or more of iron, manganese, cobalt, and nickel. The substance included in the second region 104 is expressed by the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1).

Lithium is extracted from and inserted into the compounds in the first region 102 and the second region 104 during charge and discharge. Therefore, in the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1), and in the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1), x1 and x2 are each a given value in the range of 0 to 1. In some cases, the first region 102 and the second region 104 each have a lithium concentration gradient.

In the olivine structure, the diffusion path (channel) of lithium is one-dimensionally in a <010> direction. In the case where each of the first region 102 and the second region 104 includes a phosphate compound having an olivine structure, the diffusion paths (channels) of lithium of the first region 102 and the second region 104 are not bent and are aligned with each other when the axis directions of the crystal lattices of the first region 102 and the second region 104 are the same; therefore, charge and discharge are easily performed. It is preferable that a difference between the axis direction of the crystal lattice of the first region 102 and that of the second region 104 be within 10 degrees and they be substantially the same.

Since the first region 102 and the second region 104 include different constituent elements or have different ratios of constituent elements, the lattice constant of the crystal in the first region 102 and that in the second region 104 are different from each other. When the regions having different lattice constants are in contact with each other, there is a possibility that stress, lattice distortion, or lattice mismatch is generated at the boundary so that diffusion of lithium is inhibited. Thus, the first region 102 and the second region 104 preferably have a concentration gradient of a transition metal, in order to change continuously the lattice constant of the first region 102 and the second region 104. When the lattice constant is continuously changed, stress or distortion is reduced; thus, diffusion of lithium is easily performed.

Since in the positive electrode active material described in this embodiment, both the first region 102 and the second region 104 include a phosphate compound having an olivine structure, an energy barrier when lithium is inserted into and extracted from a surface of the positive electrode active material can be decreased. As a result, the positive electrode active material 100 makes it possible to bring an available capacity close to a theoretical capacity and utilize a high discharge potential of one or more of manganese, cobalt, and nickel.

Embodiment 3

In this embodiment, a structure of a positive electrode active material which is one embodiment of the present invention will be described with reference to FIG. 2.

Figure 2:
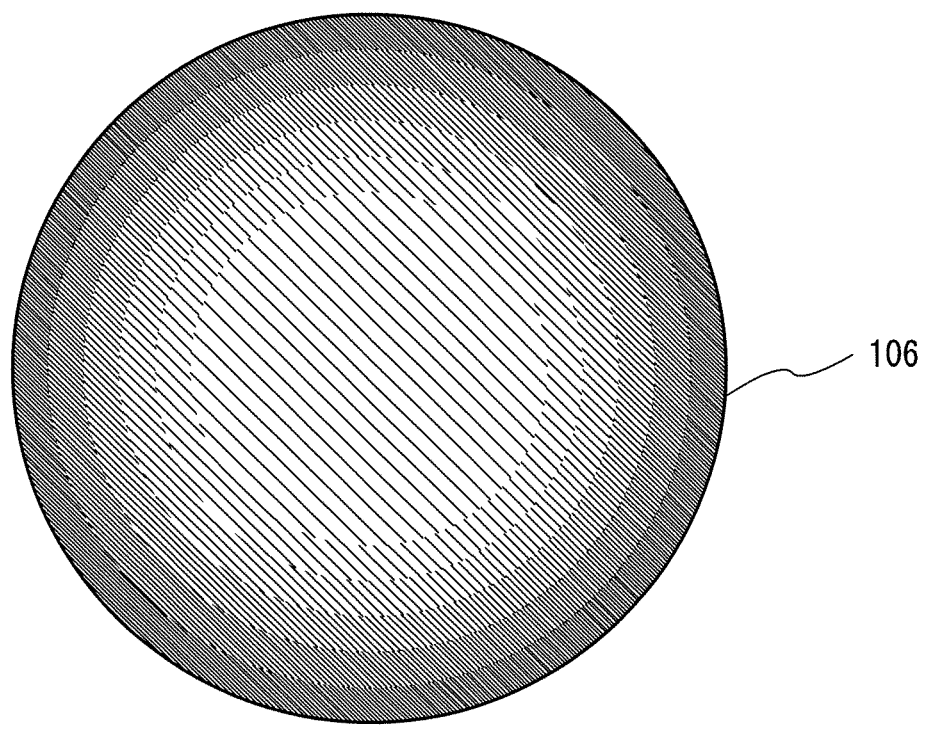
FIG. 2 is an example of a cross-sectional view of a positive electrode active material (in particle form).

FIG. 2 is a schematic cross-sectional view of a positive electrode active material in particle form which is one embodiment of the present invention.

As described in FIG. 2, in this embodiment, a positive electrode active material in particle form includes a compound containing lithium (Li), iron (Fe), and a transition metal (one or more of manganese (Mn), cobalt (Co), and nickel (Ni)) and a superficial portion of the positive electrode active material has higher iron concentration than a center portion of the positive electrode active material (hereinafter, this positive electrode active material is referred to as a positive electrode active material 106). Alternatively, a positive electrode active material in particle form includes a compound containing lithium, iron, and a transition metal (one or more of manganese, cobalt, and nickel), a second region of the positive electrode active material has higher iron concentration than a first region of the positive electrode active material, and the first region is closer to the center than the second region. Since the superficial portion of the positive electrode active material particle includes a compound containing iron, an energy barrier when lithium is inserted into and extracted from the surface of the positive electrode active material can be decreased. As a result, the positive electrode active material 106 makes it possible to bring an available capacity close to a theoretical capacity and utilize a high discharge potential of one or more of manganese, cobalt, and nickel.

The positive electrode active material is in particle form, and a positive electrode active material layer described later includes a plurality of particles.

The positive electrode active material 106 may be formed using a phosphate compound containing lithium, iron, and one or more of manganese, cobalt, and nickel. As a typical example of a phosphate compound, a phosphate compound having an olivine structure can be given. The phosphate compound containing lithium, iron, and one or more of manganese, cobalt, and nickel may include a region having an olivine structure.

In the case where the positive electrode active material 106 is formed using a phosphate compound including a region having an olivine structure, the positive electrode active material 106 includes lithium, a transition metal, and phosphoric acid ($PO_4$). As the transition metal, the one containing iron and one or more of manganese, cobalt, and nickel and containing one or more of iron, manganese, cobalt, and nickel can be given. When the positive electrode active material 106 contains one or more of manganese, cobalt, and nickel having a high oxidation-reduction potential, a high discharge potential is realized. Further, the higher the proportion of one or more of manganese, cobalt, and nickel in the positive electrode active material is, the higher the proportion of discharge capacity due to oxidation-reduction of one or more of manganese, cobalt, and nickel becomes, so that high energy density can be realized.

The phosphate compound containing lithium, iron, and one or more of manganese, cobalt, and nickel, which forms the positive electrode active material 106, may contain a substance expressed by a general formula, $Li_{1-x}Fe_yM_{1-y}PO_4$ (x is greater than or equal to 0 and less than or equal to 1; M is one or more of Mn, Co, and Ni; and y is greater than 0 and less than 1). The substance expressed by the above general formula may have an olivine structure. On the surface, y is made to be greater than 0 and less than 1, preferably greater than or equal to 0.15 and less than or equal to 0.5, more preferably greater than or equal to 0.2 and less than or equal to 0.3, whereby higher energy density can be realized.

Lithium is extracted from and inserted into the compound which forms the positive electrode active material 106 during charge and discharge. In the general formula, $Li_{1-x}Fe_y M_{1-y}PO_4$ (x is greater than or equal to 0 and less than or equal to 1; M is one or more of Mn, Co, and Ni; and y is greater than 0 and less than 1), x is a given value in the range of 0 to 1. In some cases, the positive electrode active material 106 has a lithium concentration gradient.

For the compound in the positive electrode active material 106, an alkali metal (e.g., sodium (Na) or potassium (K)), an alkaline earth metal (e.g., calcium (Ca), strontium (Sr), or barium (Ba)), beryllium (Be), or magnesium (Mg) can be used instead of lithium. Alternatively, for the compound in the positive electrode active material 106, a compound containing lithium and one or more of an alkali metal and an alkaline earth metal can be used.

Since the superficial portion of the particle of the positive electrode active material includes a compound containing iron in the positive electrode active material 106 described in this embodiment, the energy barrier when lithium is inserted into and extracted from the surface of the positive electrode active material can be decreased. As a result, the positive electrode active material 106 makes it possible to bring an available capacity close to a theoretical capacity and utilize a high discharge potential of one or more of manganese, cobalt, and nickel.

Embodiment 4

In this embodiment, a method for forming a positive electrode active material which is one embodiment of the present invention will be described.

First, the first region 102 is formed.

The quantities of the materials at which a desired molar ratio can be obtained are weighed in accordance with the stoichiometric proportion of the general formula of the compound containing lithium and one or more of manganese, cobalt, and nickel, which is described in Embodiments 1 and 2. For example, in the case of the above phosphate compound having an olivine structure, the general formula described in Embodiments 1 and 2 is to be referred to. The weights of the materials are accurately weighed in accordance with a molar ratio of lithium:iron:M: a phosphate group=1:y1:(1-y1):1 (note that y1 is greater than or equal to 0 and less than 1, preferably less than or equal to 0.1, more preferably 0).

As a material containing lithium, lithium carbonate ($LiCO_3$), lithium hydroxide (Li(OH)), lithium hydroxide hydrate (Li(OH).$H_2O$), lithium nitrate ($LiNO_3$), and the like can be given. As a material containing iron, iron(II) oxalate dihydrate (Fe(COO)$_2$.2$H_2O$), iron chloride ($FeCl_2$), and the like can be given. As a material containing phosphate, diammonium hydrogen phosphate (($NH_4)_2HPO_4$), ammonium dihydrogen phosphate ($NH_4H_2PO_4$), phosphorus pentoxide ($P_2O_5$), and the like can be given.

As a material containing manganese, manganese carbonate ($MnCO_3$), manganese chloride tetrachloride ($MnCl_2$.4$H_2O$), and the like can be given. As a material containing nickel, nickel oxide (NiO), nickel hydroxide (Ni(OH)$_2$), and the like can be given. As a material containing cobalt, cobalt carbonate ($CoCO_3$), cobalt chloride ($CoCl_2$), and the like can be given.

The materials containing any of metals such as lithium, iron, manganese, nickel, and cobalt are not limited to the respective above materials, and another oxide, carbonate, oxalate, chloride, hydrosulfate, or the like may be used.

The material containing phosphate is not limited to the above materials, and another material containing phosphate can be used.

The weighed materials are put in a mill machine and ground until the materials become fine powder (a first grinding step). At this time, it is better to use a mill machine made of a substance (e.g., agate) which prevents other metals from entering the materials. When a small amount of acetone, alcohol, or the like is added at this time, the materials are easily clumped together; thus, the materials can be prevented from being scattered as powder.

After that, the powder is subjected to a step of applying a first pressure and is thus molded into a pellet state. The pellet is put into a baking furnace, and heated. In such a manner, a first baking step is performed. Various degassing and thermal decomposition of the materials are substantially performed in this step. Through this step, a compound containing lithium and one or more of manganese, cobalt, and nickel is formed.

For example, a phosphate compound having an olivine structure and containing lithium and one or more of manganese, cobalt, and nickel is formed.

After that, the pellet is introduced into the mill machine together with a solvent such as acetone, and is ground again (a second grinding step). Through the above steps, the first region 102 is formed.

Next, the second region 104 in film form is formed.

The quantities of the materials at which a desired molar ratio can be obtained are weighed in accordance with the stoichiometric proportion of the general formula of the compound containing lithium and iron, which is described in Embodiments 1 and 2. For example, in the case of a phosphate compound having an olivine structure, the above general formula is to be referred to. The weights of the materials are accurately weighed in accordance with a molar ratio of lithium:iron:Me: a phosphate group=1: y2:(1-y2):1 (note that y2 is greater than 0 and less than or equal to 1, preferably greater than or equal to 0.15 and less than or equal to 0.5, more preferably greater than or equal to 0.2 and less than or equal to 0.3).

The weighed materials are put in the mill machine and ground until the materials become fine powder (a third grinding step). At this time, it is better to use a mill machine made of a substance (e.g., agate) which prevents other metals from entering the materials. When a small amount of acetone, alcohol, or the like is added at this time, the materials are easily clumped together; thus, the materials can be prevented from being scattered as powder.

After that, the powder obtained through the second grinding step (a portion to be the first region 102) and the powder obtained through the third grinding step (a material for forming the second region 104) are sufficiently mixed with each other, subjected to a step of applying a second pressure, and molded into a pellet state. The pellet is put into a baking furnace, and heated. In such a manner, a second baking step is performed. Various degassing and thermal decomposition of the materials of the compound containing lithium and iron are substantially performed in this step. Through this step, the positive electrode active material 100 including the first region 102 which includes a compound containing lithium and one or more of manganese, cobalt, and nickel and the second region 104 which covers the surface of the first region 102 and includes a compound containing lithium and iron is formed. For example, the positive electrode active material 100 is formed, which includes the first region 102 that includes a phosphate compound having an olivine structure and containing lithium and one or more of manganese, cobalt, and nickel and the second region 104 that covers the surface of the first region 102 and includes a phosphate compound having an olivine structure and containing lithium and iron.

After that, the pellet is introduced into the mill machine together with a solvent such as acetone (a fourth grinding step). Next, the fine powder is molded again into a pellet state, and a third baking step is performed in the baking furnace. Through the third baking step, a plurality of particles of the positive electrode active material 100 can be formed, which includes the first region 102 that includes a compound containing lithium and one or more of manganese, cobalt, and nickel and the second region 104 that covers the surface of the first region 102 and includes a compound containing lithium and iron. For example, a plurality of particles of the positive electrode active material 100 including the first region 102 which includes a phosphate compound with high crystallinity having an olivine structure and containing lithium and one or more of manganese, cobalt, and nickel and the second region 104 which covers the surface of the first region 102 and includes a phosphate compound with high crystallinity having an olivine structure and containing lithium and iron can be formed.

By adjustment of the conditions of the third baking step, elements included in the first region 102 and elements included in the second region 104 are diffused into the first region 102 and the second region 104 and the boundary between the first region 102 and the second region 104 becomes unclear, so that a structure described in Embodiment 3 (the positive electrode active material 106) can be formed.

Note that in the third baking step, an organic compound such as glucose may be added. When the subsequent steps are performed after glucose is added, carbon supplied from the glucose is supported on the surface of the positive electrode active material.

Note that in this specification, a state in which a surface of a positive electrode active material is supported with a carbon material also means that an iron phosphate compound is carbon-coated.

The thickness of the supported carbon (a carbon layer) is greater than 0 nm and less than or equal to 100 nm, preferably greater than or equal to 2 nm and less than or equal to 10 nm.

By supporting carbon on the surface of the positive electrode active material, the conductivity of the surface of the positive electrode active material can be increased. In addition, when the positive electrode active materials are in contact with each other through carbon supported on the surfaces, the positive electrode active materials are electrically connected to each other; thus, the conductivity of the positive electrode active material described can be further increased.

Note that although glucose is used in this embodiment as a carbon supply source because glucose easily reacts with a phosphate group, cyclic monosaccharide, straight-chain monosaccharide, or polysaccharide which reacts well with a phosphate group may be used instead of glucose.

The grain size of the particle of the positive electrode active material 100, which is obtained through the third baking step, is greater than or equal to 10 nm and less than or equal to 100 nm, preferably greater than or equal to 20 nm and less than or equal to 60 nm. The particle of the positive electrode active material is small when the grain size of the particle of the positive electrode active material is within the above range; therefore, lithium ions are easily inserted and extracted. Thus, rate characteristics of a secondary battery are improved and charge and discharge can be performed in a short time.

As a formation method of the first region, a sol-gel method, a hydrothermal method, a coprecipitation method, a spray drying method, or the like may be used instead of the method described in this embodiment. Further, as a formation method of the second region in film form, a sputtering method, a CVD method, a sol-gel method, a hydrothermal method, a coprecipitation method, or the like may be used instead of the method described in this embodiment.

According to this embodiment, an energy barrier when lithium is inserted into and extracted from the surface of the positive electrode active material can be decreased. As a result, a positive electrode active material that makes it possible to bring an available capacity close to a theoretical capacity and utilize a high discharge potential of one or more of manganese, cobalt, and nickel can be formed.

Embodiment 5

As an example of a power storage device including a positive electrode active material obtained through the above steps, a lithium-ion secondary battery will be described below. The schematic structure of the lithium-ion secondary battery is illustrated in FIG. 3.

Figure 3:
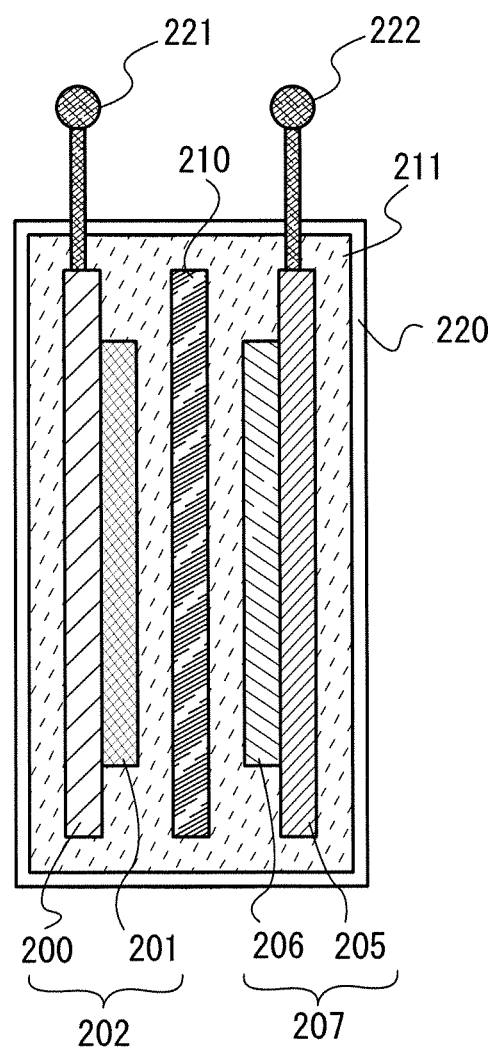
FIG. 3 is an example of a cross-sectional view of a power storage device.

In the lithium-ion secondary battery illustrated in FIG. 3, a positive electrode 202, a negative electrode 207, and a separator 210 are provided in a housing 220 which is isolated from the outside, and an electrolyte solution 211 is filled in the housing 220. In addition, the separator 210 is provided between the positive electrode 202 and the negative electrode 207.

A positive electrode active material layer 201 is formed in contact with a positive electrode current collector 200. The positive electrode active material layer 201 includes the positive electrode active material 100 which is described in Embodiments 1, 2, and 4. The positive electrode active material 100 includes the first region 102 which includes a compound containing lithium and one or more of manganese, cobalt, and nickel and the second region 104 which covers the surface of the first region 102 and includes a compound containing lithium and iron. Alternatively, the positive electrode active material layer 201 includes the positive electrode active material 106 in particle form which is described in Embodiment 3 and 4. The positive electrode active material 106 includes a compound containing lithium, iron, and a transition metal (one or more of manganese, cobalt, and nickel) and a superficial portion of the positive electrode active material has higher iron concentration than a center portion of the positive electrode active material. Further alternatively, the positive electrode active material layer 201 includes the positive electrode active material 106 in particle form which includes a compound containing lithium, iron, and a transition metal (one or more of manganese, cobalt, and nickel), in which a second region of the positive electrode active material has higher iron concentration than a first region of the positive electrode active material, and in which the first region is closer to the center than the second region. In this specification, the positive electrode active material layer 201 and the positive electrode current collector 200 over which the positive electrode active material layer 201 is formed are collectively referred to as the positive electrode 202.

On the other hand, a negative electrode active material layer 206 is formed in contact with a negative electrode current collector 205. In this specification, the negative electrode active material layer 206 and the negative electrode current collector 205 over which the negative electrode active material layer 206 is formed are collectively referred to as the negative electrode 207.

A first electrode 221 and a second electrode 222 are connected to the positive electrode current collector 200 and the negative electrode current collector 205, respectively, and charge and discharge are performed through the first electrode 221 and the second electrode 222.

Moreover, there are certain gaps between the positive electrode active material layer 201 and the separator 210 and between the negative electrode active material layer 206 and the separator 210. However, the structure is not particularly limited thereto; the positive electrode active material layer 201 may be in contact with the separator 210, and the negative electrode active material layer 206 may be in contact with the separator 210. Further, the lithium-ion secondary battery may be rolled into a cylinder shape with the separator 210 provided between the positive electrode 202 and the negative electrode 207.

Note that the "active material" refers to a material that relates to insertion and extraction of ions which function as carriers and does not include a carbon layer including glucose, or the like. When the positive electrode 202 is formed by a coating method described later, the active material including a carbon layer is mixed with another material such as a conduction auxiliary agent, a binder, or a solvent and is formed as the positive electrode active material layer 201 over the positive electrode current collector 200. Thus, the active material and the positive electrode active material layer 201 are distinguished.

As the positive electrode current collector 200, a material having high conductivity such as aluminum or stainless steel can be used. The electrode current collector 200 can have a foil shape, a plate shape, a net shape, a thin film shape which is formed over an insulating substrate such as a glass substrate, or the like as appropriate.

As the positive electrode active material, the positive electrode active material 100 is used. The positive electrode active material 100 includes the first region 102 which includes a compound containing lithium and one or more of manganese, cobalt, and nickel and the second region 104 which covers the surface of the first region 102 and includes a compound containing lithium and iron. For example, the positive electrode active material 100 is used, which includes the first region 102 including a substance that has an olivine structure and is expressed by the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1); and the second region 104 covering the first region 102 and including a substance that has an olivine structure and is expressed by the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1).

Alternatively, as the positive electrode active material, the positive electrode active material 106 in particle form which includes a compound containing lithium, iron, and a transition metal (one or more of manganese, cobalt, and nickel) and in which a superficial portion of the positive electrode active material has higher iron concentration than a center portion of the positive electrode active material; or the positive electrode active material 106 in particle form which includes a compound containing lithium, iron, and a transition metal (one or more of manganese, cobalt, and nickel), in which a second portion of the positive electrode active material has higher iron concentration than a first portion of the positive electrode active material, and in which the first portion is closer to the center than the second portion, is used. For example, the positive electrode active material 106 which has an olivine structure and includes a substance expressed by the general formula, $Li_{1-x}Fe_yM_{1-y}PO_4$ (x is greater than or equal to 0 and less than or equal to 1; M is one or more of Mn, Co, and Ni; and y is greater than 0 and less than 1) is used.

After the third baking step described in Embodiment 4, the obtained positive electrode active material is ground again (a fifth grinding step) with the mill machine; thus, fine particles are obtained. The obtained fine particles are used as a positive electrode active material, to which a conduction auxiliary agent, a binder, or a solvent is added to obtain paste.

As the conduction auxiliary agent, a material which is itself an electron conductor and does not cause chemical reaction with other materials in a battery device may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that assists conductivity between active materials: it is sealed between active materials which are apart and makes conduction between the active materials.

As the binder, a polysaccharide such as starch, polyvinyl alcohol, carboxymethyl cellulose, hydroxypropyl cellulose, regenerated cellulose, or diacetyl cellulose; a thermoplastic resin such as polyvinyl chloride, polyvinyl pyrrolidone, polytetrafluoroethylene, polyvinylide fluoride, polyethylene, or polypropylene; or a polymer with rubber elasticity such as ethylene-propylene-diene monomer (EPDM), sulfonated EPDM, styrene-butadiene rubber, butadiene rubber, fluorine rubber, or polyethylene oxide can be given.

The active material, the conduction auxiliary agent, and the binder are mixed at 80 wt % to 96 wt %, 2 wt % to 10 wt %, and 2 wt % to 10 wt %, respectively, to be 100 wt % in total. Further, an organic solvent, the volume of which is approximately the same as that of the mixture of the active material, the conduction auxiliary agent, and the binder, is mixed therein and processed into a slurry state. Note that an object which is obtained by processing, into a slurry state, a mixture of the active material, the conduction auxiliary agent, the binder, and the organic solvent is referred to as slurry. As the solvent, N-methyl-2-pyrrolidone, lactic acid ester, or the like can be used. The proportions of the active material, the conduction auxiliary agent, and the binder are preferably adjusted as appropriate in such a manner that, for example, when the active material and the conduction auxiliary agent have low adhesiveness at the time of film formation, the amount of binder is increased, and when the resistance of the active material is high, the amount of conduction auxiliary agent is increased.

Here, an aluminum foil is used as the positive electrode current collector 200, and the slurry is dropped thereon and is thinly spread by a casting method. Then, after the slurry is further stretched by a roller press machine and the thickness is made uniform, the positive electrode active material layer 201 is formed over the positive electrode current collector 200 by vacuum drying (under a pressure of less than or equal to 10 Pa) or heat drying (at a temperature of 150° C. to 280° C.). As the thickness of the positive electrode active material layer 201, a desired thickness is selected from the range of 20 μm to 100 μm. It is preferable to adjust the thickness of the positive electrode active material layer 201 as appropriate so that cracks and separation do not occur. Further, it is preferable that cracks and separation be made not to occur on the positive electrode active material layer 201 not only when the positive electrode current collector is flat but also when the positive electrode current collector is rolled into a cylinder shape, though it depends on the form of the lithium-ion secondary battery.

As the negative electrode current collector 205, a material having high conductivity such as copper, stainless steel, iron, or nickel can be used.

As the negative electrode active material layer 206, lithium, aluminum, graphite, silicon, germanium, or the like is used. The negative electrode active material layer 206 may be formed over the negative electrode current collector 205 by a coating method, a sputtering method, an evaporation method, or the like. Note that it is possible to omit the negative electrode current collector 205 and use any one of the materials alone as the negative electrode active material layer 206. The theoretical lithium insertion capacities are each larger in germanium, silicon, lithium, and aluminum than that in graphite. When the insertion capacity is large, charge and discharge can be performed sufficiently even in a small area and a function as a negative electrode can be obtained; therefore, cost reduction and miniaturization of a secondary battery can be realized. However, countermeasures against deterioration are needed because there are the following problems: in the case of silicon or the like, the volume is increased approximately fourth times as large as the volume before lithium insertion so that the material itself becomes vulnerable, and a reduction in charge and discharge capacity due to repetition of charge and discharge (i.e., cycle deterioration) becomes remarkable.

The electrolyte solution contains alkali metal ions or alkaline earth metal ions which are carrier ions, and these ions are responsible for electrical conduction. As examples of the alkali metal ion, a lithium ion, a sodium ion, and a potassium ion are given, for example. As examples of the alkaline earth metal ion, a beryllium ion, a magnesium ion, a calcium ion, a strontium ion, and a barium ion are given, for example.

The electrolyte solution 211 includes, for example, a solvent and a lithium salt or a sodium salt dissolved in the solvent. Examples of the lithium salts include lithium chloride (LiCl), lithium fluoride (LiF), lithium perchlorate (LiClO$_4$), lithium tetrafluoroborate (LiBF$_4$), LiAsF$_6$, LiPF$_6$, Li(C$_2$F$_5$SO$_2$)$_2$N, and the like. Examples of the sodium salts include sodium chloride (NaCl), sodium fluoride (NaF), sodium perchlorate (NaClO$_4$), and sodium tetrafluoroborate (NaBF$_4$).

Examples of the solvent for the electrolyte solution 211 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), methylisobutyl carbonate (MIBC), and dipropyl carbonate (DPC)); aliphatic carboxylic acid esters (e.g., methyl formate, methyl acetate, methyl propionate, and ethyl propionate); acyclic ethers (e.g., 1,2-dimethoxyethane (DME), 1,2-diethoxyethane (DEE), ethoxymethoxy ethane (EME), and γ-lactones such as γ-butyrolactone); cyclic ethers (e.g., tetrahydrofuran and 2-methyltetrahydrofuran); cyclic sulfones (e.g., sulfolane); alkyl phosphate ester (e.g., dimethylsulfoxide and 1,3-dioxolane, and trimethyl phosphate, triethyl phosphate, and trioctyl phosphate); and fluorides thereof. All of the above solvents can be used either alone or in combination as the electrolyte solution 211.

As the separator 210, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. However, a material which does not dissolve in the above-described electrolyte solution 211, should be selected.

More specific examples of materials for the separator 210 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in combination.

When charge of the lithium-ion secondary battery described above is performed, a positive electrode terminal is connected to the first electrode 221 and a negative electrode terminal is connected to the second electrode 222. An electron is taken away from the positive electrode 202 through the first electrode 221 and transferred to the negative electrode 207 through the second electrode 222. In addition, a lithium ion is eluted from the positive electrode active material in the positive electrode active material layer 201 from the positive electrode, reaches the negative electrode 207 through the separator 210, and is taken in the negative electrode active material in the negative electrode active material layer 206. At the same time, in the positive electrode active material layer 201, an electron is released outside from the positive electrode active material, and an oxidation reaction of a transition metal (one or more of iron, manganese, cobalt, and nickel) contained in the positive electrode active material occurs.

At the time of discharge, in the negative electrode 207, the negative electrode active material layer 206 releases lithium as an ion, and an electron is transferred to the second electrode 222. The lithium ion passes through the separator 210, reaches the positive electrode active material layer 201, and is taken in the positive electrode active material in the positive electrode active material layer 201. At that time, an electron from the negative electrode 207 also reaches the positive electrode 202, and a reduction reaction of the transition metal (one or more of iron, manganese, cobalt, and nickel) contained in the positive electrode active material occurs.

The smaller the ratio c of the thickness d of the second region 104 to the grain size r of the particle of the positive electrode active material 100 (c=d/r) is, the larger the energy density obtained in this embodiment becomes. The ratio c is preferably greater than or equal to 0.005 and less than or equal to 0.25, more preferably greater than or equal to 0.01 and less than or equal to 0.1. Specifically, the thickness of the second region is preferably about 1 nm to 8 nm. In addition, when the ratio c is changed, a positive electrode active material having desirable energy density can be formed.

The lithium-ion secondary battery manufactured in the above manner includes a compound containing one or more of manganese, cobalt, and nickel as the first region 102 of the positive electrode active material or as the positive electrode active material 106. Since one or more of manganese, cobalt, and nickel is contained in the positive electrode active material, a high discharge potential is realized. For example, there is a difference between positive electrode active materials having an olivine structure and containing different transition metals; however, the theoretical capacities per unit weight of the active material are almost the same regardless of kinds of the contained transition metals. Therefore, the higher the discharge potential is, the more likely high energy density is to be obtained.

However, even when a positive electrode active material which includes a phosphate compound having an olivine structure and containing lithium and one or more of manganese, cobalt, and nickel is used, the expected capacity has not been obtained. One reason of this is thought to be existence of an energy barrier when lithium is inserted into and extracted from a surface of the active material.

On the other hand, an energy barrier when lithium is inserted into and extracted from the surface of the positive electrode active material can be decreased with the use of any of the following materials obtained in this embodiment: the positive electrode active material 100 which includes the first region 102 including a compound containing lithium and one or more of manganese, cobalt, and nickel and the second region 104 which covers the surface of the first region 102 and which includes a compound containing lithium and iron; the positive electrode active material 106 in particle form which includes a compound containing lithium, iron, and a transition metal (one or more of manganese, cobalt, and nickel) and in which a superficial portion of the positive electrode active material has higher iron concentration than a center portion f the positive electrode active material; and the positive electrode active material 106 in particle form which includes compound containing lithium, iron, and a transition metal (one or more of manganese, cobalt, and nickel), in which a second portion of the positive electrode active material has higher iron concentration than a first portion of the positive electrode active material, and in which the first portion is closer to the center than the second portion. As a result, the positive electrode active material 100 or the positive electrode active material 106 makes it possible to bring an available capacity close to a theoretical capacity and utilize a high discharge potential of one or more of manganese, cobalt, and nickel.

Embodiment 6

The positive electrode active material layer 201 described in Embodiment 5 may be formed using a positive electrode active material in film form. The case where the positive electrode active material layer 201 is formed using a positive electrode active material in film form is described in this embodiment.

Figure 4:
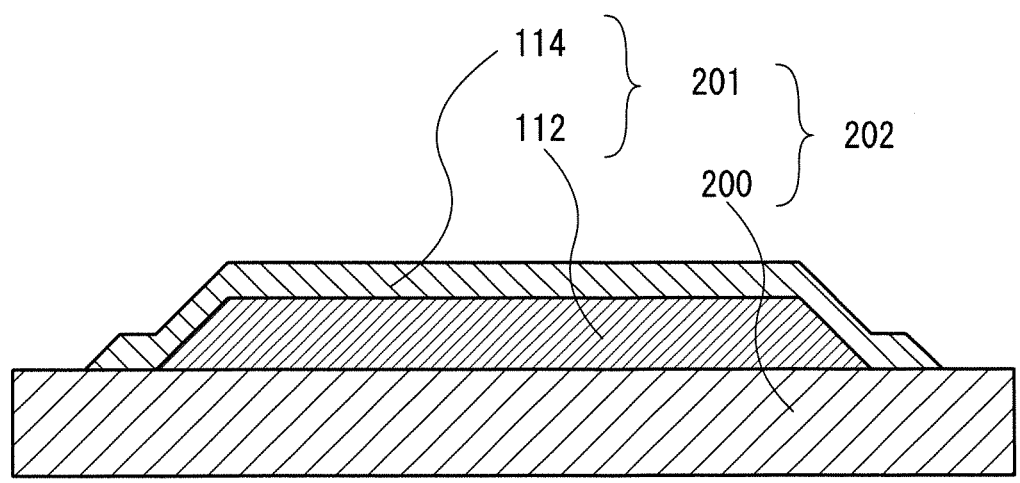
FIG. 4 is an example of a cross-sectional view of a positive electrode including a positive electrode active material.

As illustrated in FIG. 4, in this embodiment, the positive electrode active material layer 201 includes a first region in film form which includes a compound containing lithium and one or more of manganese, cobalt, and nickel (hereinafter, this region is referred to as a first region 112) and a second region in film form which includes a compound containing lithium and iron (hereinafter, this region is referred to as a second region 114). The first region 112 is covered with the second region 114.

In other words, a top surface or a top surface and a side surface of the first region 112 in film form which includes a compound containing lithium and one or more of manganese, cobalt, and nickel, is/and covered with the second region 114 in film form which includes a compound containing lithium and iron. Since a superficial portion of the positive electrode active material layer 201 includes the second region 114 containing iron, an energy barrier when lithium is inserted into and extracted from the surface of the positive electrode active material can be decreased. As a result, the positive electrode active material layer 201 makes it possible to bring an available capacity close to a theoretical capacity and utilize a high discharge potential of one or more of manganese, cobalt, and nickel.

The positive electrode active material is formed to have film form, so that the proportion of the positive electrode active material in the positive electrode active material layer can be increased. Since the positive electrode active material layer 201 is formed using only the first region 112 in film form and the second region 114 in film form, the proportion of the positive electrode active material in the positive electrode active material layer 201 can be 100% ideally. Therefore, the energy density per unit area can be increased.

The first region 112 may be formed using a phosphate compound containing lithium and one or more of manganese, cobalt, and nickel. As a typical example of a phosphate compound, a phosphate compound having an olivine structure can be given. The phosphate compound containing lithium and one or more of manganese, cobalt, and nickel, which forms the first region 112, may include a region having an olivine structure. In addition, the structure of the first region 112 may be a single crystal structure, a polycrystalline structure, a microcrystalline structure, or an amorphous structure.

In the case where the first region 112 is formed using a phosphate compound including a region having an olivine structure, the first region 112 includes lithium, a transition metal, and phosphoric acid ($PO_4$). As the transition metal, the one containing one or more of iron, manganese, cobalt, and nickel and one or more of manganese, cobalt, and nickel can be given. When the first region 112 contains one or more of manganese, cobalt, and nickel having a high oxidation-reduction potential, a high discharge potential is realized. Further, the higher the proportion of one or more of manganese, cobalt, and nickel in the positive electrode active material is, the higher the proportion of discharge capacity due to oxidation-reduction of one or more of manganese, cobalt, and nickel becomes, so that high energy density can be realized.

The phosphate compound containing lithium and one or more of manganese, cobalt, and nickel, which forms the first region 112, may include a substance expressed by the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1). The substance expressed by the above general formula may have an olivine structure. When y1 is made to be greater than or equal to 0 and less than 1, preferably less than or equal to 0.1, more preferably 0, higher energy density can be realized.

The second region 114 may be formed using a phosphate compound containing lithium and iron. As a typical example of a phosphate compound, a phosphate compound having an olivine structure can be given. The phosphate compound containing lithium and iron, which forms the second region 114, may include a region having an olivine structure. In addition, the structure of the second region 114 may be a single crystal structure, a polycrystalline structure, a microcrystalline structure, or an amorphous structure.

In the case where the second region 114 is formed using a phosphate compound including a region having an olivine structure, the second region 114 includes lithium, a transition metal, and phosphoric acid ($PO_4$). As the transition metal, the one containing iron and one or more of iron, manganese, cobalt, and nickel can be given.

The phosphate compound containing lithium and iron, which forms the second region 114, may include a substance expressed by the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1). The substance expressed by the above general formula may have an olivine structure.

The second region 114 is formed using preferably a compound functioning as a positive electrode active material which contributes to charge and discharge, in order not to lead to a reduction in capacity. In the case where a phosphate compound including a region having an olivine structure is used for the second region 114, high capacity can be realized in charging and discharging.

On the other hand, the second region 114 includes iron; thus, a discharge potential is decreased and energy density is decreased. Therefore, the smaller the ratio $c_f$ of the thickness $d_f$ of the second region 114 to the thickness $r_f$ of the positive electrode active material layer 201 ($c_f = d_f/r_f$) is, the better. The ratio $c_f$ is preferably greater than or equal to 0.005 and less than or equal to 0.25, more preferably greater than or equal to 0.01 and less than or equal to 0.1. Specifically, the thickness of the second region is preferably about 1 nm to 8 nm. In addition, when the ratio $c_f$ is changed, a positive electrode active material having desirable energy density can be formed. In the general formula, $Li_{1-x2}Fe_{y2}Me_{1-y2}PO_4$ (x2 is greater than or equal to 0 and less than or equal to 1; and Me is one or more of Mn, Co, and Ni), y2 is made to be greater than 0 and less than or equal to 1, preferably greater than or equal to 0.15 and less than or equal to 0.5, more preferably greater than or equal to 0.2 and less than or equal to 0.3, whereby higher energy density can be realized.

Lithium is extracted from and inserted into the compounds in the first region 112 and the second region 114 during charge and discharge. Therefore, in the general formula, $Li_{1-x1}Fe_{y1}M_{1-y1}PO_4$ (x1 is greater than or equal to 0 and less than or equal to 1; M is one or more of Mn, Co, and Ni; and y1 is greater than or equal to 0 and less than 1), and in the general formula, $Li_{1-x2}Fe_{y2}Me_{1-y2}PO_4$ (x2 is greater than or equal to 0 and less than or equal to 1; Me is one or more of Mn, Co, and Ni; and y2 is greater than 0 and less than or equal to 1), x1 and x2 are each a given value in the range of 0 to 1. In some cases, the first region 112 and the second region 114 each have a lithium concentration gradient.

In the first region 112, the concentration of the transition metal contained in the compound is not necessarily constant. Also in the second region 114, the concentration of the transition metal contained in the compound is not necessarily constant.

For the compounds in the first region 112 and the second region 114, an alkali metal (e.g., sodium (Na) or potassium (K)), an alkaline earth metal (e.g., calcium (Ca), strontium (Sr), or barium (Ba)), beryllium (Be), or magnesium (Mg) can be used instead of lithium. Alternatively, for the compounds in the first region 112 and the second region 114, a compound containing lithium and one or more of an alkali metal and an alkaline earth metal can be used.

In the positive electrode active material layer 201 described in this embodiment, the top surface or the top surface and the side surface of the first region 112 in film form which includes a compound containing lithium and one or more of manganese, cobalt, and nickel, is/and covered with the second region 114 in film form which includes a compound containing lithium and iron. Since the superficial portion of the positive electrode active material layer 201 includes the second region 114 containing iron, the energy barrier when lithium is inserted into and extracted from the surface of the positive electrode active material can be decreased. As a result, the positive electrode active material layer 201 makes it possible to bring an available capacity close to a theoretical capacity and utilize a high discharge potential of one or more of manganese, cobalt, and nickel.

Embodiment 7

In this embodiment, an example of a structure of a positive electrode included in a power storage device which is one embodiment of the present invention will be described with reference to FIG. 5, FIG. 6, and FIG. 7, which is different from that in FIG. 4.

Figure 5:
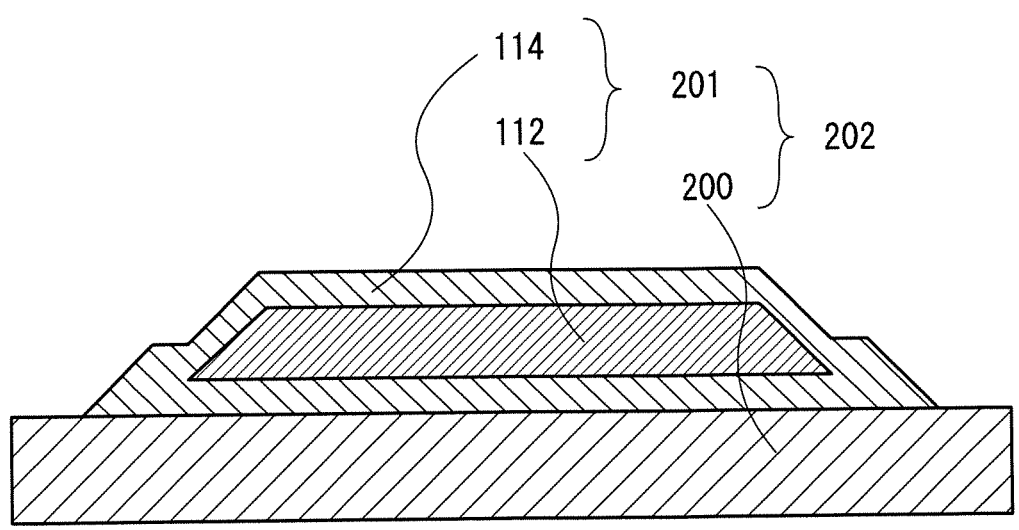
FIG. 5 is an example of a cross-sectional view of a positive electrode including a positive electrode active material.
Figure 6:
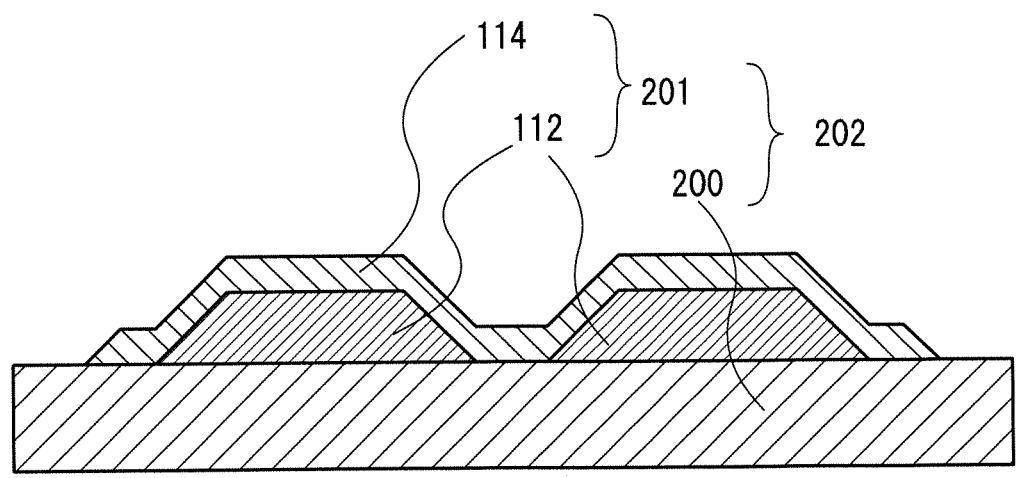
FIG. 6 is an example of a cross-sectional view of a positive electrode including a positive electrode active material.
Figure 7:
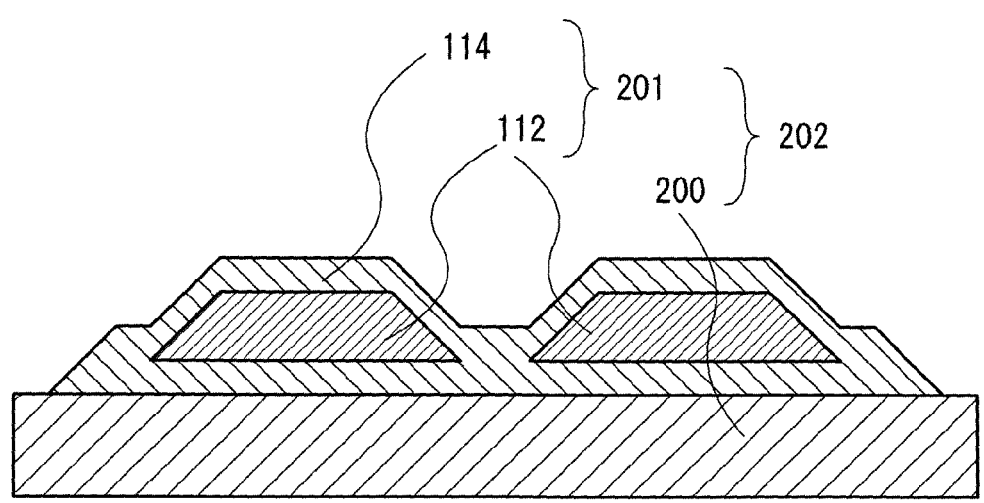
FIG. 7 is an example of a cross-sectional view of a positive electrode including a positive electrode active material.

FIG. 5, FIG. 6, and FIG. 7 are each a schematic cross-sectional view of the positive electrode included in the power storage device which is one embodiment of the present invention.

As illustrated in FIG. 5, in this embodiment, the positive electrode active material layer 201 includes the first region 112 in film form which includes a compound containing lithium and one or more of manganese, cobalt, and nickel and the second region 114 in film form which includes a compound containing lithium and iron. The first region 112 is covered with the second region 114. The top surface or the top surface and the side surface of the first region 112 is/are covered with the second region 114 and there is the second region 114 between the first region 112 and the positive electrode current collector 200.

FIG. 6 and FIG. 7 each show the case where a plurality of first regions 112 is provided while FIG. 4 and FIG. 5 each show the case where one first region 112 is provided.

Other structures can be similar to those of Embodiment 6.

Embodiment 8

In this embodiment, a structure of a positive electrode included in a power storage device which is one embodiment of the present invention will be described with reference to FIG. 8.

Figure 8:
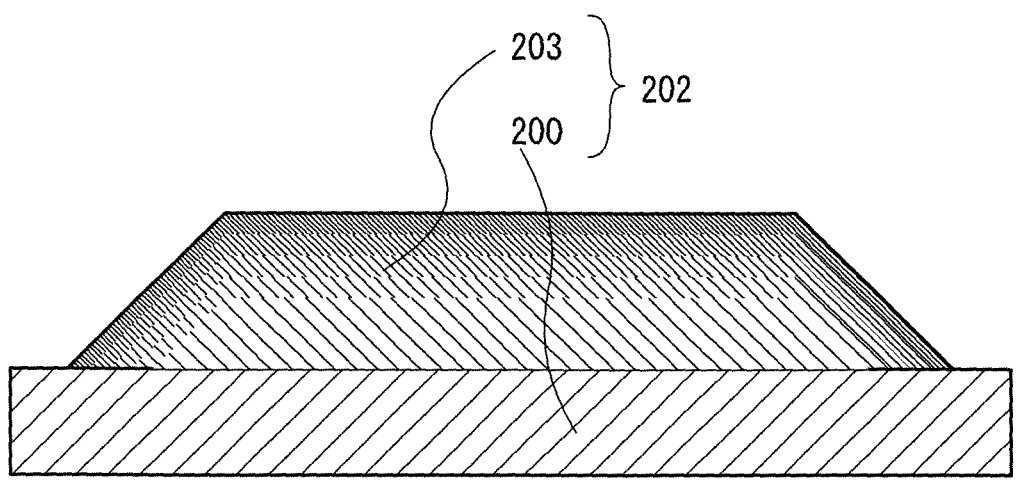
FIG. 8 is an example of a cross-sectional view of a positive electrode including a positive electrode active material.

FIG. 8 is a schematic cross-sectional view of the positive electrode included in the power storage device which is one embodiment of the present invention.

As illustrated in FIG. 8, in this embodiment, a positive electrode active material layer includes a compound containing lithium (Li), iron (Fe), and a transition metal (one or more of manganese (Mn), cobalt (Co), and nickel (Ni)) and a superficial portion of the positive electrode active material has higher iron concentration than a portion close to a positive electrode current collector of the positive electrode active material (hereinafter, this positive electrode active material layer is referred to as a positive electrode active material layer 203). Alternatively, the positive electrode active material layer 203 includes a compound containing lithium, iron, and a transition metal (one or more of manganese, cobalt, and nickel), a second portion of the positive electrode active material has higher iron concentration than a first portion of the positive electrode active material, and the second portion is closer to the surface than the first portion.

Since the superficial portion of the positive electrode active material layer 203 includes a compound containing iron, the energy barrier when lithium is inserted into and extracted from the surface of the positive electrode active material can be decreased. As a result, the positive electrode active material layer 203 makes it possible to bring an available capacity close to a theoretical capacity and utilize a high discharge potential of one or more of manganese, cobalt, and nickel.

The positive electrode active material is formed to have film form, so that the proportion of the positive electrode active material in the positive electrode active material layer can be increased. Since the positive electrode active material layer 203 is formed using a positive electrode active material in film form, the proportion of the positive electrode active material in the positive electrode active material layer 203 can be 100% ideally. Therefore, the energy density per unit area can be increased.

The compound containing lithium, iron, and one or more of manganese, cobalt, and nickel may be a phosphate compound. As a typical example of a phosphate compound, a phosphate compound having an olivine structure can be given. The compound containing lithium, iron, and one or more of manganese, cobalt, and nickel may include a region having an olivine structure.

In the case where the positive electrode active material layer 203 is formed using a phosphate compound including a region having an olivine structure, the positive electrode active material layer 203 includes lithium, a transition metal, and phosphoric acid ($PO_4$). As the transition metal, the one containing one or more of iron, manganese, cobalt, and nickel and containing iron and one or more of manganese, cobalt, and nickel can be given. When the positive electrode active material layer 203 contains one or more of manganese, cobalt, and nickel having a high oxidation-reduction potential, a high discharge potential is realized. Further, the higher the proportion of one or more of manganese, cobalt, and nickel in the positive electrode active material is, the higher the proportion of discharge capacity due to oxidation-reduction of one or more of manganese, cobalt, and nickel becomes, so that high energy density can be realized.

The phosphate compound containing lithium, iron, and one or more of manganese, cobalt, and nickel, which forms the positive electrode active material layer 203, may contain a substance expressed by the general formula, $Li_{1-x}Fe_yM_{1-y}PO_4$ (x is greater than or equal to 0 and less than or equal to 1; and M is one or more of Mn, Co, and Ni). The substance expressed by the above general formula may have an olivine structure. On the surface, y is made to be greater than 0 and less than 1, preferably greater than or equal to 0.15 and less than or equal to 0.5, more preferably greater than or equal to 0.2 and less than or equal to 0.3, whereby higher energy density can be realized.

Lithium is extracted from and inserted into the compound which forms the positive electrode active material layer 203 during charge and discharge. In the general formula, $Li_{1-x}Fe_yM_{1-y}PO_4$ (x is greater than or equal to 0 and less than or equal to 1; M is one or more of Mn, Co, and Ni; and y is greater than 0 and less than 1), x is a given value in the range of 0 to 1. In some cases, the positive electrode active material layer 203 has a lithium concentration gradient.

For the compound in the positive electrode active material layer 203, an alkali metal (e.g., sodium (Na) or potassium (K)), an alkaline earth metal (e.g., calcium (Ca), strontium (Sr), or barium (Ba)), beryllium (Be), or magnesium (Mg) can be used instead of lithium. Alternatively, for the compound in the positive electrode active material layer 203, a compound containing lithium and one or more of an alkali metal and an alkaline earth metal can be used.

Since the superficial portion of the positive electrode active material includes a compound containing iron in the positive electrode active material layer 203 described in this embodiment, the energy barrier when lithium is inserted into and extracted from the surface of the positive electrode active material can be decreased. As a result, the positive electrode active material layer 203 makes it possible to bring an available capacity close to a theoretical capacity and utilize a high discharge potential of one or more of manganese, cobalt, and nickel.

Embodiment 9

In this embodiment, a method for forming a positive electrode included in a power storage device which is one embodiment of the present invention will be described.

Figure 9A:
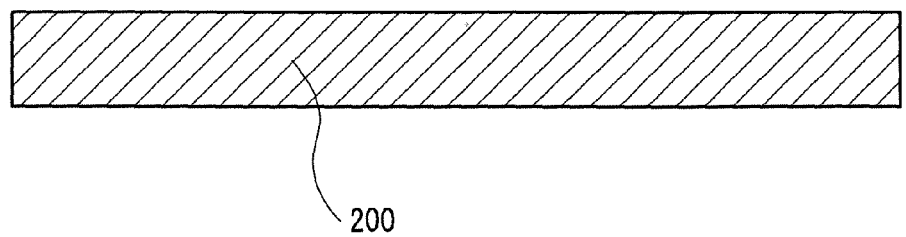
FIGS. 9A to 9C are diagrams illustrating an example of a method for forming a positive electrode including a positive electrode active material.

First, the positive electrode current collector 200 is prepared (FIG. 9A).

There is no particular limitation on a material used for the positive electrode current collector 200; however, a material having high conductivity such as platinum, aluminum, copper, or titanium can be used. In this embodiment, titanium is used.

Figure 9B:
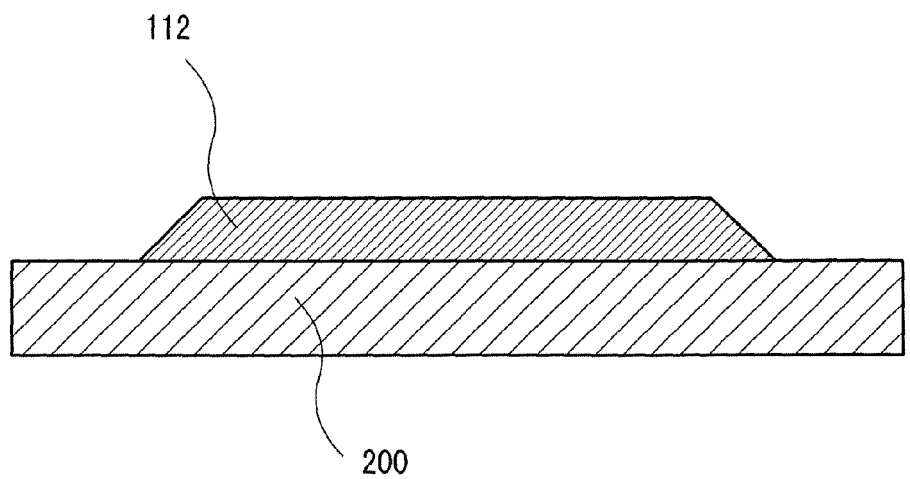

Next, the first region 112 which includes a compound containing lithium and one or more of manganese, cobalt, and nickel is formed over the positive electrode current collector 200 (FIG. 9B).

As a method for forming the first region 112 which includes the compound containing lithium and one or more of manganese, cobalt, and nickel, a dry process such as a PVD method (e.g., a sputtering method), a vacuum evaporation method, or a CVD method (e.g., a plasma CVD method, a thermal CVD method, or an LPCVD method) can be used. By using the dry process, the first region 112 which includes the compound containing lithium and one or more of manganese, cobalt, and nickel is formed, whereby the first region 112 which includes the compound containing lithium and one or more of manganese, cobalt, and nickel can be made uniform and thin. Therefore, the charge and discharge characteristics of the positive electrode can be stabilized.

In this embodiment, the first region 112 including, for example, a phosphate compound is formed by a sputtering method. For example, by using a target which includes a substance expressed by a general formula, $LiFe_{y1}M_{1-y1}PO_4$ (M is one or more of Mn, Co, and Ni; and y1 is greater than or equal to 0 and less than 1), a phosphate compound film with a thickness of 10 nm to 3 μm is formed.

Note that heat treatment may be performed after the first region 112 is formed. For example, heat treatment can crystallize the first region 112 or can increase the crystallinity.

The temperature of the heat treatment is preferably set at higher than or equal to 450° C. and lower than or equal to 700° C. In addition, the heat treatment is performed for greater than or equal to 30 minutes and less than or equal to 40 hours, preferably greater than or equal to 2 hours and less than or equal to 10 hours. Further, an atmosphere of the heat treatment is preferably a rare gas atmosphere, a nitrogen atmosphere, or the like. For example, the heat treatment can be performed at 600° C. for 4 hours in a nitrogen atmosphere.

Through the above steps, the first region 112 is formed.

Figure 9C:
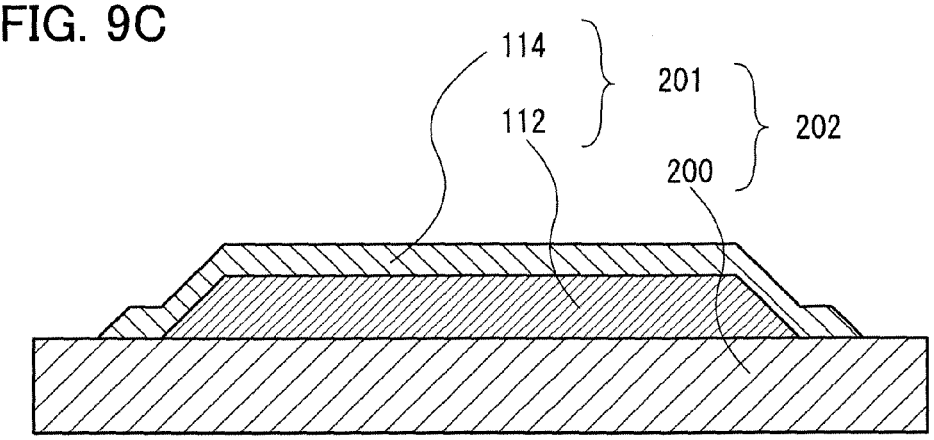

Next, the second region 114 which includes a compound containing lithium and iron is formed over the positive electrode current collector 200 over which the first region 112 is formed (FIG. 9C).

As a method for forming the second region 114 which includes the compound containing lithium and iron, a dry process such as a PVD method (e.g., a sputtering method), a vacuum evaporation method, or a CVD method (e.g., a plasma CVD method, a thermal CVD method, or an LPCVD method) can be used. By using a dry process, the second region 114 which includes the compound containing lithium and iron, whereby the second region 114 which includes the compound containing lithium and iron can be made uniform and thin. Therefore, the charge and discharge characteristics of the positive electrode can be stabilized.

In this embodiment, the second region 114 including, for example, a phosphate compound is formed by a sputtering method. For example, by using a target which includes a substance expressed by a general formula $LiFe_{y2}Me_{1-y2}PO_4$ (Me is one or more of Mn, Co, and Ni; and y2 is greater than 0 and less than or equal to 1), a phosphate compound film with a thickness of 1 nm to 3 μm is formed.

The second region 114 is formed using preferably a compound functioning as a positive electrode active material which contributes to charge and discharge, in order not to lead to a reduction in capacity. In the case where a phosphate compound including a region having an olivine structure is used for the second region 114, high capacity can be realized in charging and discharging.

On the other hand, the second region 114 includes iron; thus, a discharge potential is decreased and energy density is decreased. Therefore, the smaller the ratio $c_f$ of the thickness $d_f$ of the second region 114 to the thickness $r_f$ of the positive electrode active material layer 201 ($c_f = d_f / r_f$) is, the better. The ratio $c_f$ is preferably greater than or equal to 0.005 and less than or equal to 0.25, more preferably greater than or equal to 0.01 and less than or equal to 0.1. Specifically, the thickness of the second region is preferably about 1 nm to 8 nm. In addition, when the ratio $c_f$ is changed, a positive electrode active material having desirable energy density can be formed. In the general formula, $Li_{1-x2}Fe_{y2}Me_{1-y2}PO_4$ (x2 is greater than or equal to 0 and less than or equal to 1; and Me is one or more of Mn, Co, and Ni), y2 is made to be greater than 0 and less than or equal to 1, preferably greater than or equal to 0.15 and less than or equal to 0.5, more preferably greater than or equal to 0.2 and less than or equal to 0.3, whereby higher energy density can be realized.

In this specification, the first region 112 and the second region 114 are collectively referred to as the positive electrode active material layer 201. Further, the positive electrode active material layer 201 and the positive electrode current collector 200 over which the positive electrode active material layer 201 is formed are collectively referred to as the positive electrode 202.

Note that heat treatment may be performed after the second region 114 is formed. For example, heat treatment can crystallize the positive electrode active material layer 201 including the first region 112 and the second region 114 or can increase the crystallinity.

The temperature of the heat treatment is preferably set at higher than or equal to 450° C. and lower than or equal to 700° C. In addition, the heat treatment is performed for greater than or equal to 30 minutes and less than or equal to 40 hours, preferably greater than or equal to 2 hours and less than or equal to 10 hours. Further, an atmosphere of the heat treatment is preferably a rare gas atmosphere, a nitrogen atmosphere, or the like. For example, the heat treatment can be performed at 600° C. for 4 hours in a nitrogen atmosphere.

By adjustment of heat treatment conditions after the second region 114 is formed, elements included in the first region 112 and elements included in the second region 114 are diffused into the first region 112 and the second region 114 and the boundary between the first region 112 and the second region 114 becomes unclear, so that a structure described in Embodiment 6 (the positive electrode active material layer 203) can be formed.

A covering film may be formed on a surface of the positive electrode active material layer 201 with the use of carbon or the like. A dry process such as a PVD method (e.g., a sputtering method), a vacuum evaporation method, or a CVD method (e.g., a plasma CVD method, a thermal CVD method, or an LPCVD method) can be used. Alternatively, a wet process such as a coating method may be used. Heat treatment may be performed after the covering film is formed (not illustrated).

Note that the "active material" refers to a material that relates to insertion and extraction of ions which function as carriers and does not include a covering layer including carbon, or the like.

Through the above steps, the positive electrode 202 including the positive electrode active material layer 201 is formed.

By this embodiment, an energy barrier when lithium is inserted into and extracted from the surface of the positive electrode active material can be decreased. As a result, the positive electrode 202 that makes it possible to bring an available capacity close to a theoretical capacity and utilize a high discharge potential of one or more of manganese, cobalt, and nickel can be formed.

Embodiment 10

In this embodiment, an application example of the power storage device described in Embodiment 5 is described.

The power storage device described in Embodiment 5 can be used in electronic devices, e.g., cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid electric vehicles, train vehicles, maintenance vehicles, carts, wheelchairs, or bicycles.

Figure 10A:
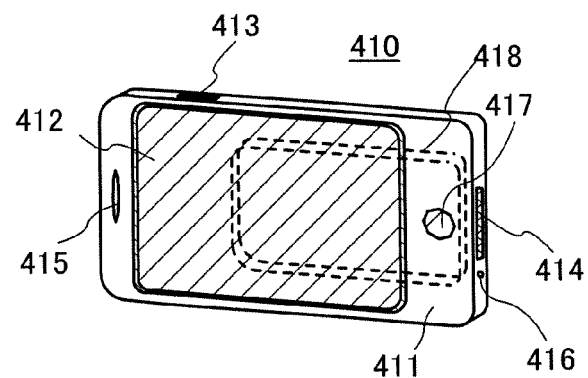
FIGS. 10A and 10B are diagrams each illustrating an application example of a power storage device.

FIG. 10A illustrates an example of a mobile phone. In a mobile phone 410, a display portion 412 is incorporated in a housing 411. The housing 411 is provided with an operation button 413, an operation button 417, an external connection port 414, a speaker 415, a microphone 416, and the like. In addition, a power storage device 418 is disposed in the housing 411, and the power storage device 418 can be charged through the external connection port 414. The power storage device described in Embodiment 5 can be used as the power storage device 418 of the mobile phone 410.

Figure 10B:
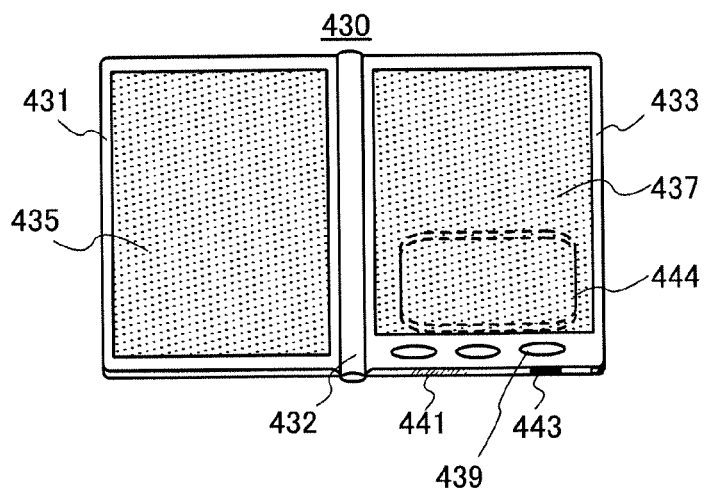

FIG. 10B illustrates an example of an e-book terminal. An e-book terminal 430 includes two housings, a first housing 431 and a second housing 433, which are combined with each other with a hinge 432. The first and second housings 431 and 433 can be opened and closed with the hinge 432 as an axis. A first display portion 435 and a second display portion 437 are incorporated in the first housing 431 and the second housing 433, respectively. In addition, the second housing 433 is provided with an operation button 439, a power switch 443, a speaker 441, and the like. In addition, a power storage device 444 is incorporated in the second housing 433, and the power storage device 444 can be charged using the power switch 443. The power storage device described in Embodiment 5 can be used as the power storage device 444 of the e-book terminal 430.

Figure 11:
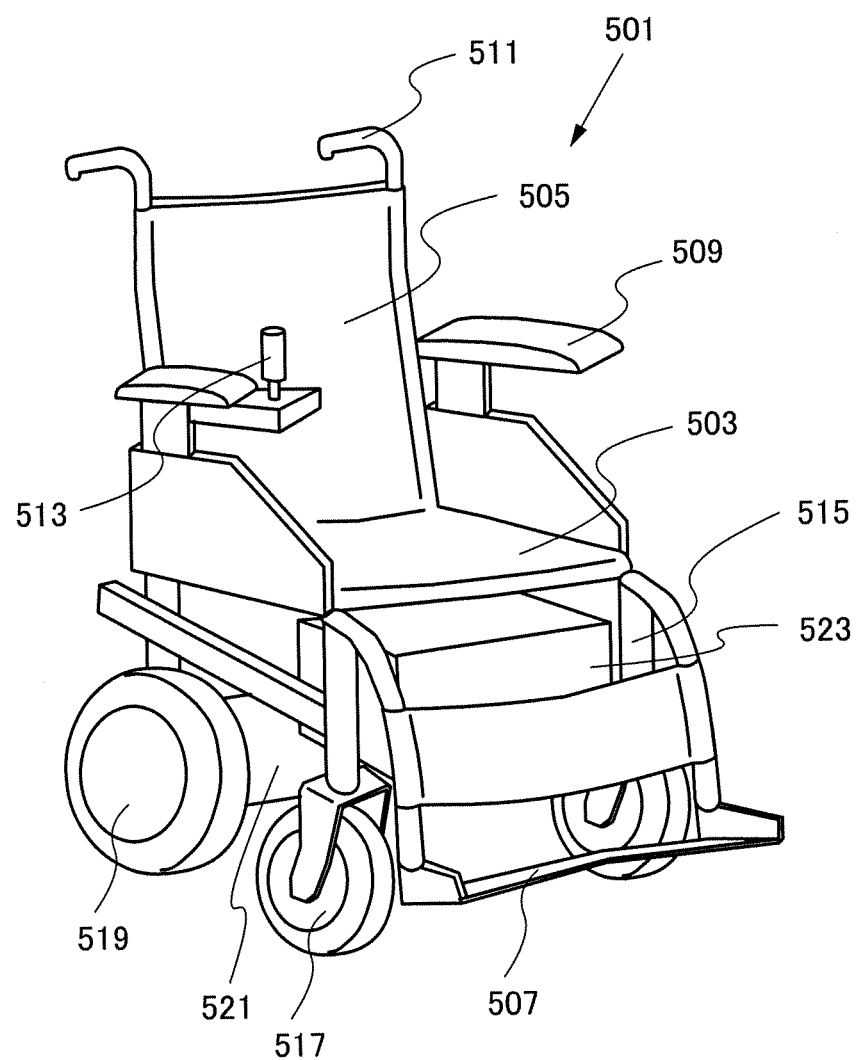
FIG. 11 is a perspective view illustrating an application example of a power storage device.

FIG. 11 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like are provided under the seat 503. The control portion 523 is connected to the controller 513 and the driving portion 521. The driving portion 521 drives through the control portion 523 with the operation of the controller 513 by the user and the control portion 523 controls the operation of moving forward, moving back, turning around, and the like, and the speed of the electric wheelchair 501.

The power storage device described in Embodiment 5 can be used in the battery of the control portion 523. The battery of the control portion 523 can be externally charged by electric power supply using plug-in systems.

Figure 12:
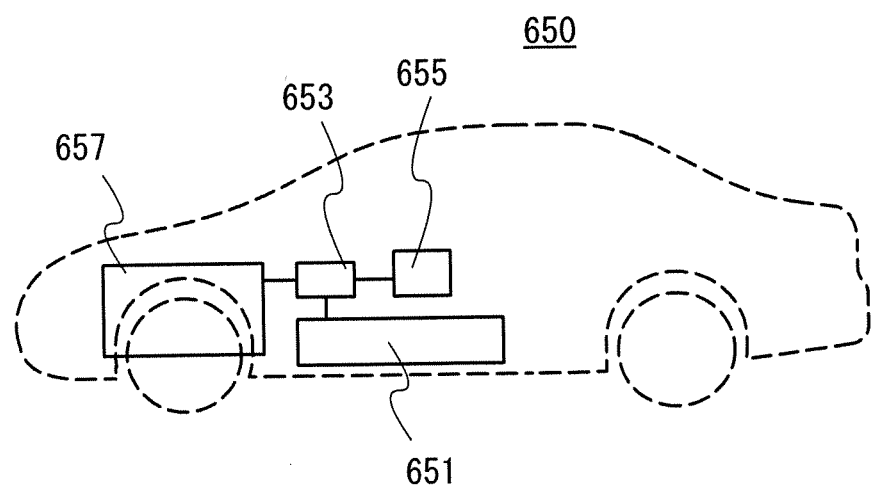
FIG. 12 is a diagram illustrating an application example of a power storage device.

FIG. 12 illustrates an example of an electric vehicle. An electric vehicle 650 is equipped with a power storage device 651. The output of the electric power of the power storage device 651 is controlled by a control circuit 653 and the electric power is supplied to a driving device 657. The control circuit 653 is controlled by a computer 655.

The driving device 657 includes a DC motor or an AC motor either alone or in combination with an internal-combustion engine. The computer 655 outputs a control signal to the control circuit 653 based on an input data such as data of a driver's operation (e.g., acceleration, deceleration, or stop) or data during driving (e.g., data of an upgrade or a downgrade or data of a load on a driving wheel) of the electric vehicle 650. The control circuit 653 adjusts the electric energy supplied from the power storage device 651 in accordance with the control signal of the computer 655 to control the output of the driving device 657. In the case where the AC motor is mounted, an inverter which converts direct current into alternate current is incorporated.

The power storage device described in Embodiment 5 can be used in the battery of the power storage device 651. Charging of the power storage device 651 can be performed by supplying power from the outside by a plug-in system.

Note that in the case where the electric propulsion vehicle is a train vehicle, the train vehicle can be charged by electric power supply from an overhead cable or a conductor rail.

This embodiment can be combined with any of the other embodiments as appropriate.

Embodiment 11

In this embodiment, an example in which the power storage device according to one embodiment of the present invention is used in a wireless power feeding system (hereinafter referred to as an RF power feeding system) will be described with reference to block diagrams in FIG. 13 and FIG. 14. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 13.

A power receiving device 800 is an electronic device or an electric propulsion vehicle which is driven by electric power supplied from a power feeding device 900, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid electric vehicles, train vehicles, maintenance vehicles, carts, wheelchairs, and the like. In addition, the power feeding device 900 has a function of supplying electric power to the power receiving device 800.

Figure 13:
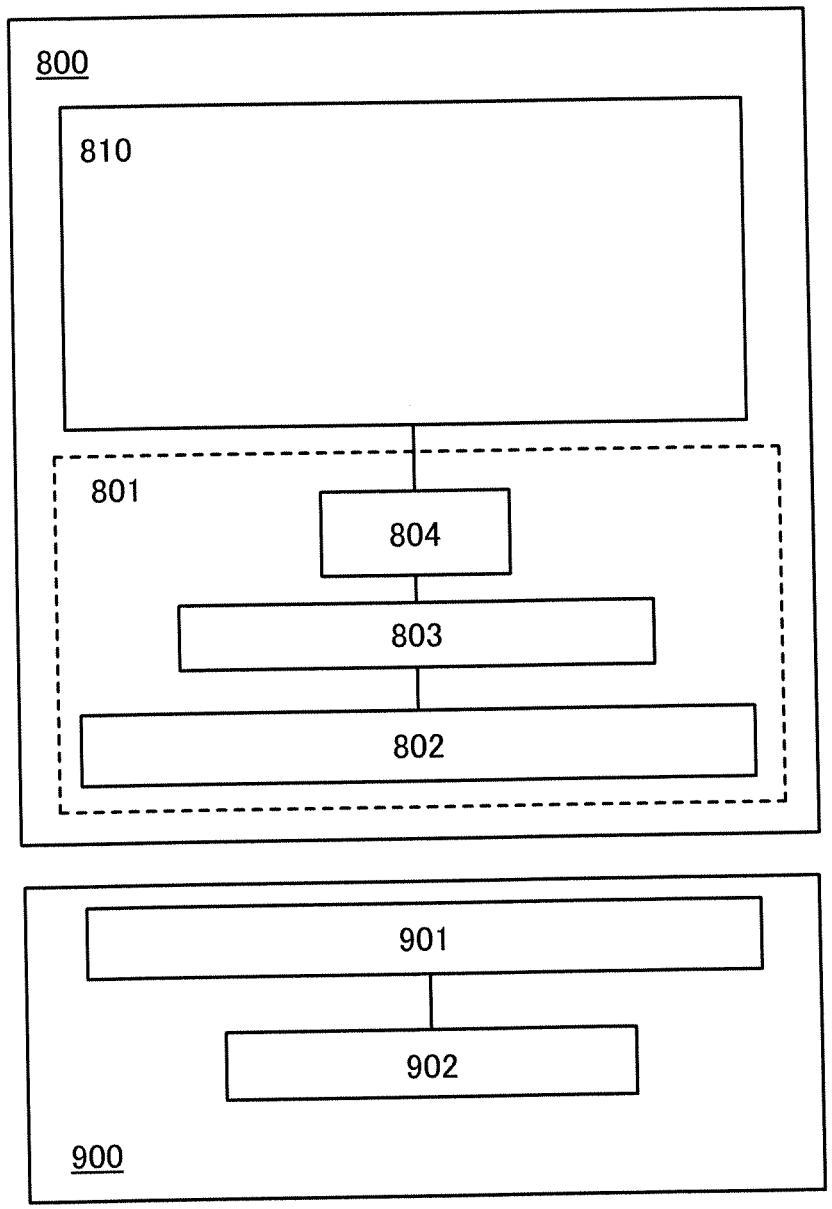
FIG. 13 is a diagram illustrating an example of a configuration of a wireless power feeding system.

In FIG. 13, the power receiving device 800 includes a power receiving device portion 801 and a power load portion 810. The power receiving device portion 801 includes at least a power receiving device antenna circuit 802, a signal processing circuit 803, and a power storage device 804. The power feeding device 900 includes a power feeding device antenna circuit 901 and a signal processing circuit 902.

The power receiving device antenna circuit 802 has a function of receiving a signal transmitted by the power feeding device antenna circuit 901 or transmitting a signal to the power feeding device antenna circuit 901. The signal processing circuit 803 processes a signal received by the power receiving device antenna circuit 802 and controls charging of the power storage device 804 and supplying of electric power from the power storage device 804 to the power load portion 810. The power load portion 810 is a driving portion which receives electric power from the power storage device 804 and drives the power receiving device 800. Typical examples of the power load portion 810 include a motor, a driving circuit, and the like. Another power load portion can be used as the power load portion 810 as appropriate. The power feeding device antenna circuit 901 has a function of transmitting a signal to the power receiving device antenna circuit 802 or receiving a signal from the power receiving device antenna circuit 802. The signal processing circuit 902 controls operation of the power feeding device antenna circuit 901. That is, the signal processing circuit 902 can control the intensity, the frequency, or the like of a signal transmitted by the power feeding device antenna circuit 901.

The power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding can be omitted).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Next, another example of the RF power feeding system is described with reference to FIG. 14.

Figure 14:
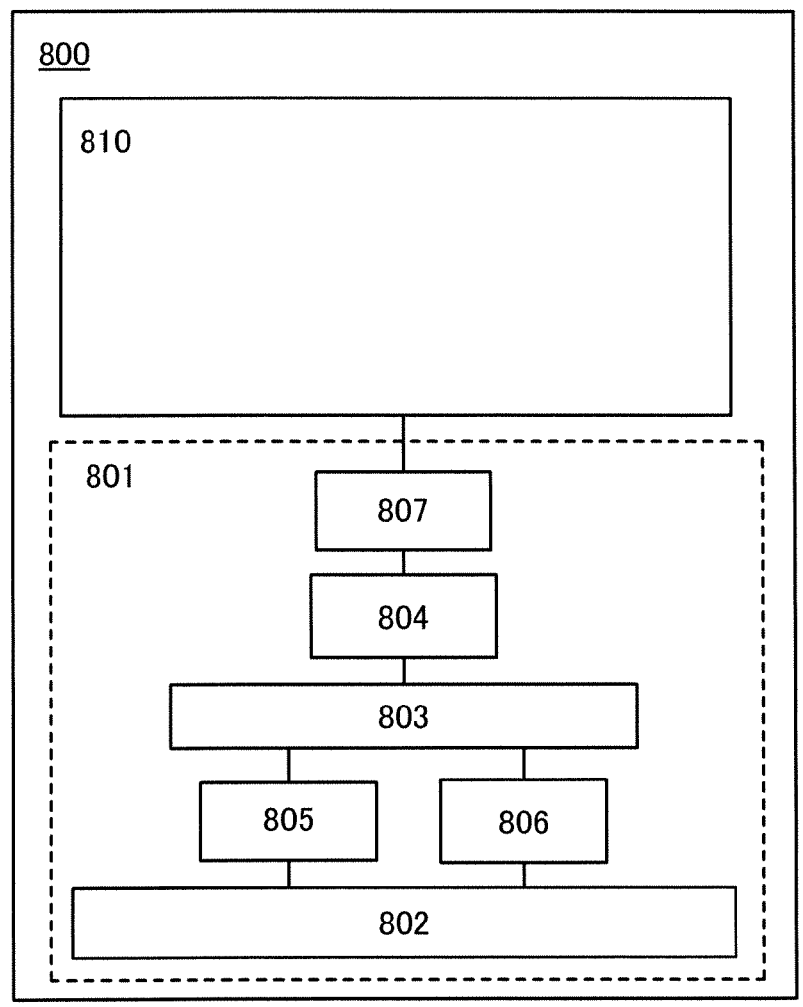
FIG. 14 is a diagram illustrating an example of a configuration of a wireless power feeding system.
Figure 14:
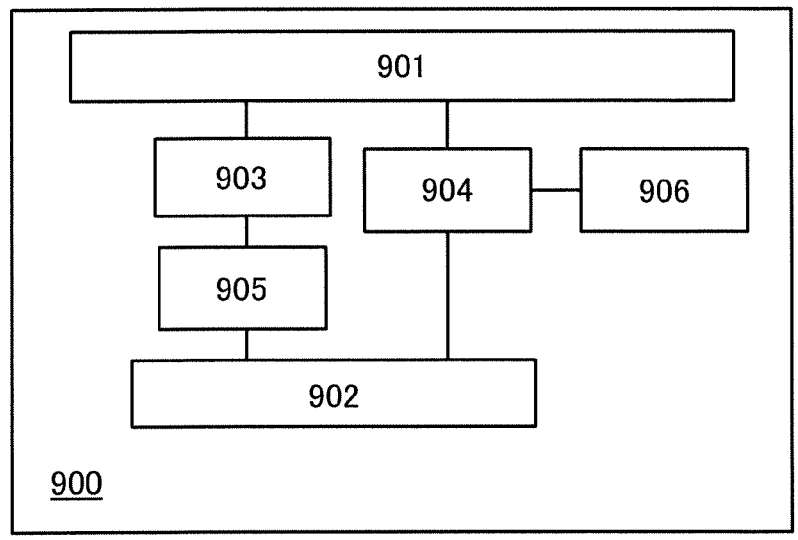

In FIG. 14, the power receiving device 800 includes the power receiving device portion 801 and the power load portion 810. The power receiving device portion 801 includes at least the power receiving device antenna circuit 802, the signal processing circuit 803, the power storage device 804, a rectifier circuit 805, a modulation circuit 806, and a power supply circuit 807. In addition, the power feeding device 900 includes at least the power feeding device antenna circuit 901, the signal processing circuit 902, a rectifier circuit 903, a modulation circuit 904, a demodulation circuit 905, and an oscillator circuit 906.

The power receiving device antenna circuit 802 has a function of receiving a signal transmitted by the power feeding device antenna circuit 901 or transmitting a signal to the power feeding device antenna circuit 901. When the power receiving device antenna circuit 802 receives a signal transmitted by the power feeding device antenna circuit 901, the rectifier circuit 805 has a function of generating DC voltage from the signal received by the power receiving device antenna circuit 802. The signal processing circuit 803 has a function of processing a signal received by the power receiving device antenna circuit 802 and controlling charging of the power storage device 804 and supplying of electric power from the power storage device 804 to the power supply circuit 807. The power supply circuit 807 has a function of converting voltage stored by the power storage device 804 into voltage needed for the power load portion 810. The modulation circuit 806 is used when a certain response is transmitted from the power receiving device 800 to the power feeding device 900.

With the power supply circuit 807, electric power supplied to the power load portion 810 can be controlled. Thus, overvoltage application to the power load portion 810 can be suppressed, and deterioration or breakdown of the power receiving device 800 can be reduced.

In addition, with the modulation circuit 806, a signal can be transmitted from the power receiving device 800 to the power feeding device 900. Therefore, when the amount of charged power in the power receiving device 800 is judged and a certain amount of power is charged, a signal is transmitted from the power receiving device 800 to the power feeding device 900 so that power feeding from the power feeding device 900 to the power receiving device 800 can be stopped. As a result, it is possible not to fully charge the power storage device 804, so that deterioration or breakdown of the power storage device 804 due to overcharge can be reduced and the number of charge times of the power storage device 804 can be increased.

The power feeding device antenna circuit 901 has a function of transmitting a signal to the power receiving device antenna circuit 802 or receiving a signal from the power receiving device antenna circuit 802. When a signal is transmitted to the power receiving device antenna circuit 802, the signal processing circuit 902 generates a signal which is transmitted to the power receiving device 800. The oscillator circuit 906 is a circuit which generates a signal with a constant frequency. The modulation circuit 904 has a function of applying voltage to the power feeding device antenna circuit 901 in accordance with the signal generated by the signal processing circuit 902 and the signal with a constant frequency generated by the oscillator circuit 906. Thus, a signal is output from the power feeding device antenna circuit 901. On the other hand, when reception of a signal from the power receiving device antenna circuit 802 is performed, the rectifier circuit 903 has a function of rectifying the received signal. From signals rectified by the rectifier circuit 903, the demodulation circuit 905 extracts a signal transmitted from the power receiving device 800 to the power feeding device 900. The signal processing circuit 902 has a function of analyzing the signal extracted by the demodulation circuit 905.

Note that any circuit may be provided between circuits as long as the RF power feeding can be performed. For example, after the power receiving device 800 receives an electromagnetic wave and the rectifier circuit 805 generates DC voltage, a circuit such as a DC-DC converter or regulator may generate constant voltage. Thus, overvoltage application to the inside of the power receiving device 800 can be suppressed.

A power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding can be omitted).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Note that when the power storage device according to one embodiment of the present invention is used in the RF power feeding system and the power receiving device antenna circuit 802 and the power storage device 804 are overlapped with each other, it is preferable that the impedance of the power receiving device antenna circuit 802 is not changed by deformation of the power storage device 804 due to charge and discharge of the power storage device 804 and deformation of an antenna due to the above deformation. When the impedance of the antenna is changed, in some cases, electric power is not supplied sufficiently. For example, the power storage device 804 may be placed in a battery pack formed using metal or ceramics. Note that in that case, the power receiving device antenna circuit 802 and the battery pack are preferably separated from each other by several tens of micrometers or more.

In this embodiment, the charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be properly selected from various methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or a very-long wave of 3 kHz to 30 kHz, is preferably used in this embodiment.

This embodiment can be implemented in combination with any of the above embodiments.

This application is based on Japanese Patent Application serial no. 2010-127236 filed with Japan Patent Office on Jun. 2, 2010 and Japanese Patent Application serial no. 2010-134107 filed with Japan Patent Office on Jun. 11, 2010, the entire contents of which are hereby incorporated by reference.

The invention claimed is:

1. A power storage device comprising:
a positive electrode comprising:
a positive electrode current collector; and
a positive electrode active material over the positive electrode current collector; and
a negative electrode facing the positive electrode with an electrolyte interposed therebetween,
wherein the positive electrode active material comprises:
a first portion comprising iron; and
a second portion which covers at least part of the first portion,
wherein the second portion has higher iron concentration than the first portion.

2. The power storage device according to claim 1, wherein axis directions of crystal lattices of the first portion of the positive electrode active material and the second portion of the positive electrode active material are the same.

3. The power storage device according to claim 1, wherein the second portion covers 30% or higher of a surface of the first portion.

4. The power storage device according to claim 1, wherein the positive electrode active material is in particle form.

5. The power storage device according to claim 1, wherein the positive electrode active material is in film form.

6. A power storage device comprising:
a positive electrode comprising:
a positive electrode current collector; and
a positive electrode active material over the positive electrode current collector; and
a negative electrode facing the positive electrode with an electrolyte interposed therebetween,
wherein the positive electrode active material is in particle form,
wherein the positive electrode active material includes a compound containing lithium, iron, and one or more of manganese, cobalt, and nickel,
wherein the positive electrode active material comprises:
a first portion; and
a second portion which covers at least part of the first portion,
wherein the second portion has higher iron concentration than the first portion, and
wherein iron concentration monotonically increases from the first portion to the second portion.

7. The power storage device according to claim 6, wherein the compound containing lithium, iron, and one or more of manganese, cobalt, and nickel is a phosphate compound.

8. The power storage device according to claim 7, wherein the phosphate compound containing lithium, iron, and one or more of manganese, cobalt, and nickel includes a region having an olivine structure.

9. A power storage device comprising:
a positive electrode comprising:
a positive electrode current collector; and
a positive electrode active material over the positive electrode current collector; and
a negative electrode facing the positive electrode with an electrolyte interposed therebetween,
wherein the positive electrode active material is in film form,
wherein the positive electrode active material includes a compound containing lithium, iron, and one or more of manganese, cobalt, and nickel,
wherein the positive electrode active material comprises:
a first portion; and
a second portion over the first portion and which covers at least part of the first portion,
wherein the second portion has higher iron concentration than the first portion,
wherein the first portion includes a concentration gradient of iron, and the second portion includes a concentration gradient of iron, and
wherein iron concentration monotonically increases from the first portion to the second portion.

10. The power storage device according to claim 9, wherein the compound containing lithium, iron, and one or more of manganese, cobalt, and nickel is a phosphate compound.

11. The power storage device according to claim 10, wherein the phosphate compound containing lithium, iron, and one or more of manganese, cobalt, and nickel includes a region having an olivine structure.

12. The power storage device according to claim 1, wherein the second portion includes a concentration gradient of iron.

13. The power storage device according to claim 1, wherein the first portion and the second portion are in contact with a surface of the positive electrode current collector.

14. The power storage device according to claim 9, wherein the first portion and the second portion are in contact with a surface of the positive electrode current collector.

* * * * *